(12) United States Patent
Okamura

(10) Patent No.: US 6,590,522 B2
(45) Date of Patent: Jul. 8, 2003

(54) PULSE RADAR DEVICE

(75) Inventor: Shigekazu Okamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/120,444

(22) Filed: Apr. 12, 2002

(65) Prior Publication Data

US 2003/0085834 A1 May 8, 2003

(30) Foreign Application Priority Data

Nov. 5, 2001 (JP) ........................................ 2001-339601

(51) Int. Cl.[7] .............................................. G01S 13/08
(52) U.S. Cl. ........................ 342/134; 342/70; 342/135; 342/136; 342/139; 342/83
(58) Field of Search ................................ 342/70–72, 82, 342/88, 89, 118, 134, 135, 136, 139

(56) References Cited

U.S. PATENT DOCUMENTS

| 3,980,983 | A | * | 9/1976 | Shannon ........................ 367/99 |
| 5,471,215 | A | * | 11/1995 | Fukuhara et al. ............. 342/70 |
| 5,798,730 | A | * | 8/1998 | Sanchez ....................... 342/195 |
| 5,815,117 | A | * | 9/1998 | Kolanek ....................... 342/442 |
| 6,208,286 | B1 | * | 3/2001 | Rostislavovich et al. ... 342/135 |
| 6,239,741 | B1 | * | 5/2001 | Fontana et al. ............. 342/135 |
| 6,353,406 | B1 | * | 3/2002 | Lanzl et al. ................. 342/118 |
| 6,426,716 | B1 | * | 7/2002 | McEwan ....................... 342/28 |
| 2002/0180632 | A1 | * | 12/2002 | Isaji ............................ 342/70 |
| 2003/0011510 | A1 | * | 1/2003 | Haruta et al. ............... 342/160 |

FOREIGN PATENT DOCUMENTS

| JP | 07-072237 | 3/1995 |
| JP | 10-062518 | 3/1998 |

OTHER PUBLICATIONS

W. Weidmann and D. Steinbuch, "A High Resolution Radar for Short Range Automotive Applications", 28th European Microwave Conference Amsterdam, 1998, pp. 590–594.

* cited by examiner

Primary Examiner—Thomas H. Tarcza
Assistant Examiner—Isam Alsomiri
(74) Attorney, Agent, or Firm—Sughrue Mion, PLLC

(57) ABSTRACT

A pulse radar device, which includes a timing control unit that controls a transmit interval of a pulse signal, a transmitting unit that transmits the pulse signal, a receiving unit that receives a receive signal including a reflection signal component from a target object and a noise component, a receive signal change detecting unit that detects a change in the assembly of the receive signals of the assembly of the pulse signals which are transmitted during a first transmit interval and the assembly of the pulse signals which are transmitted during a second transmit interval, a reflection signal rising detecting unit that detects a rising time point of the reflection signal component, and a ranging/detecting unit that obtains a distance value on the basis of the rising time point of the reflection signal and judges the presence of the target object.

10 Claims, 27 Drawing Sheets

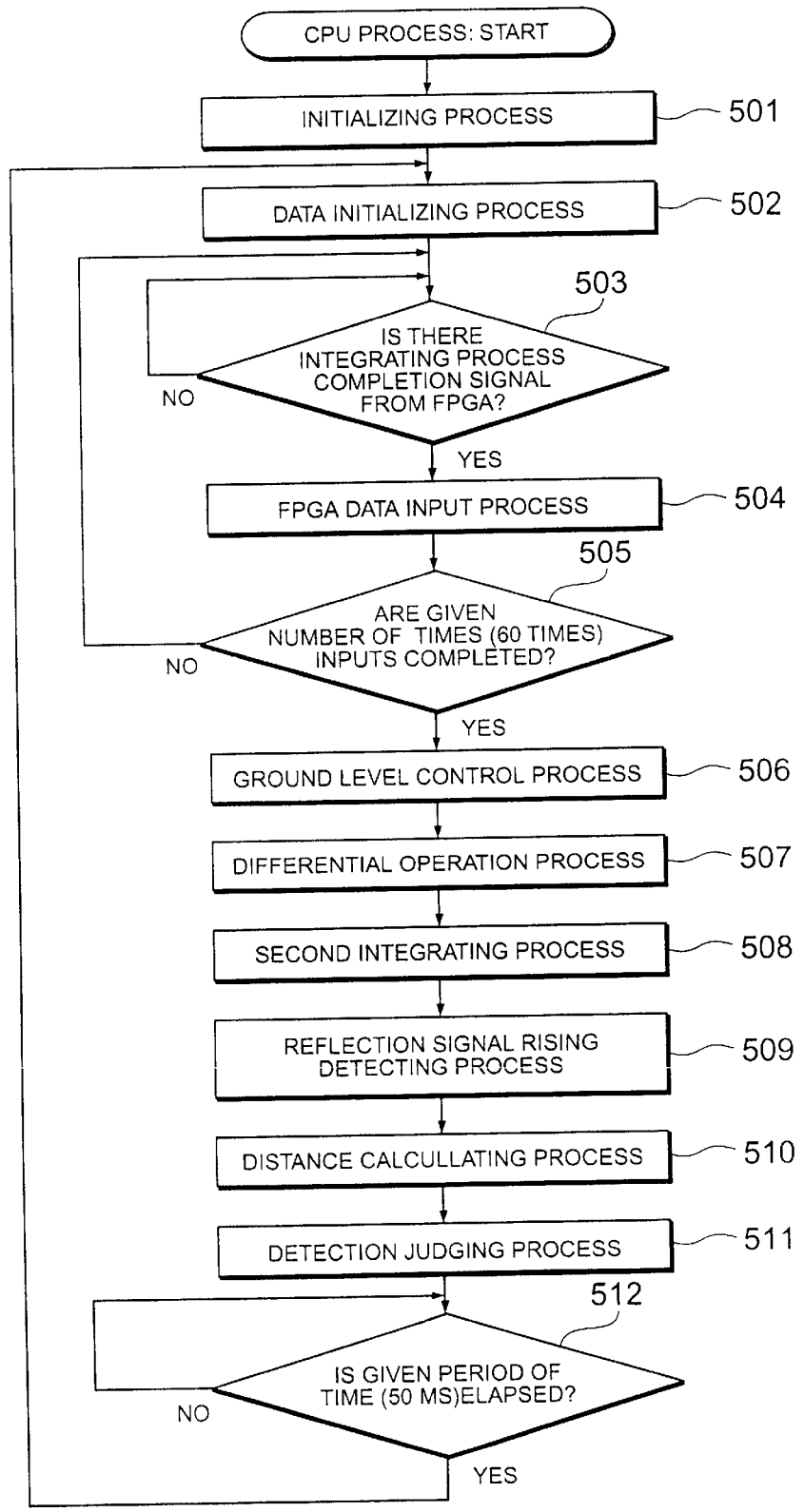

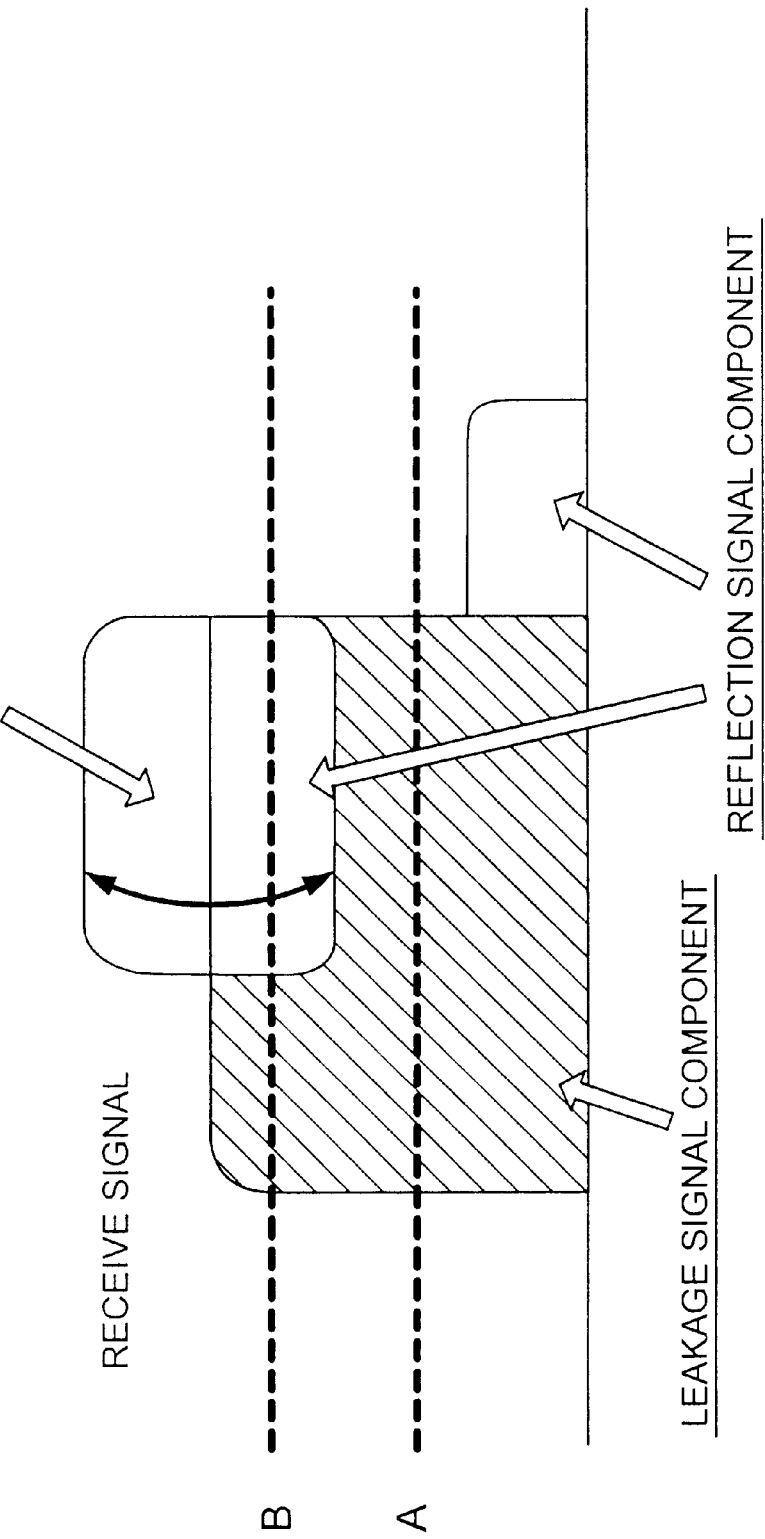

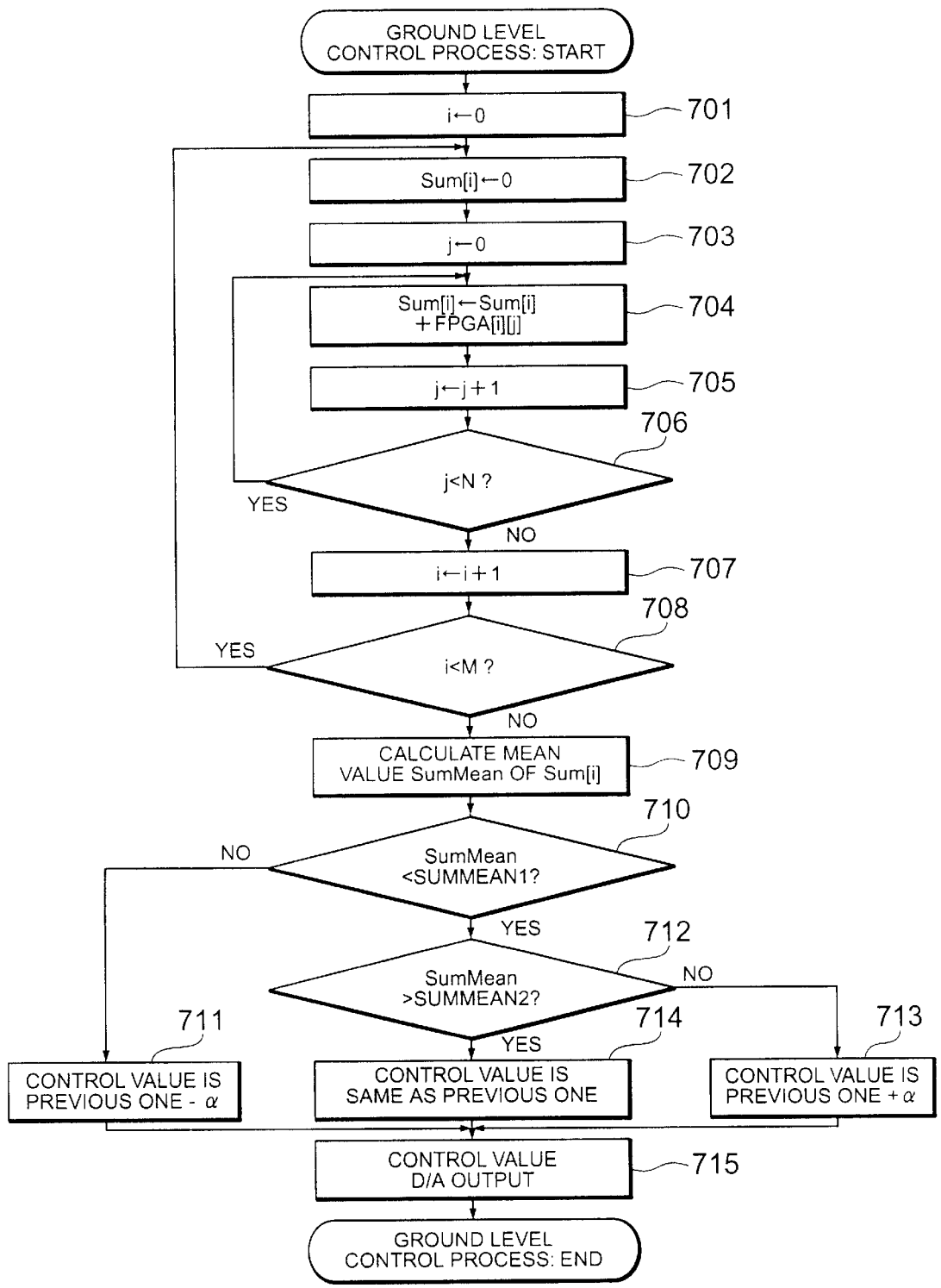

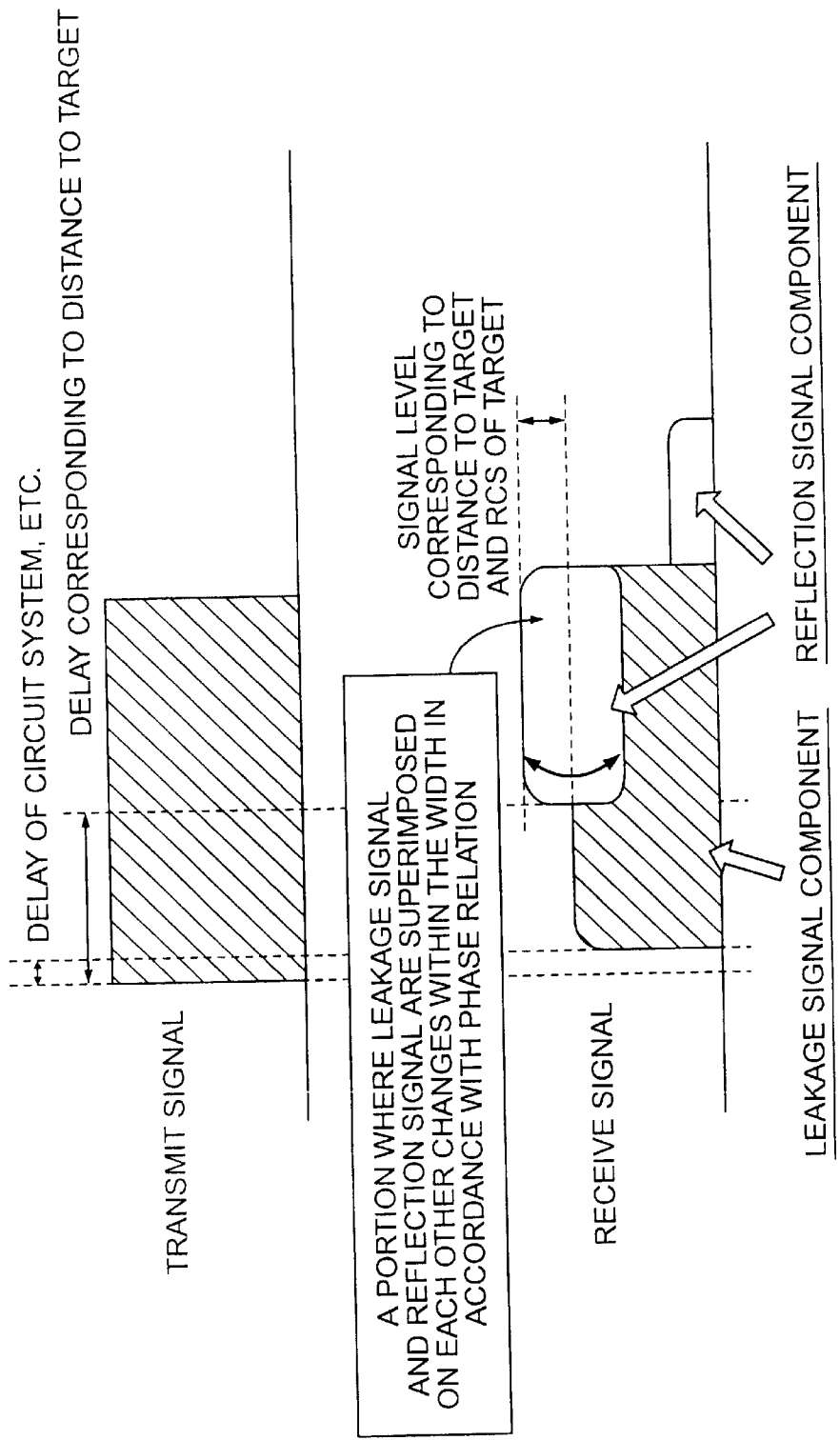

IN CASE OF 1, SIGNAL MAGNITUDE
DOES NOT CHANGE

IN CASES OF 2 TO 3, SIGNAL MAGNITUDE DOES NOT CHANGE
(IN FACT, SIGNAL SLIGHTLY CHANGES DUE TO VARIATION)

IN CASES OF 4 TO 6, WEEN PHASE DIFFERENCE
CHANGES DUE TO VARIATION OF REIJATIVE DISTANCE,
SIGNAL MGNITUDE CH3UVGES

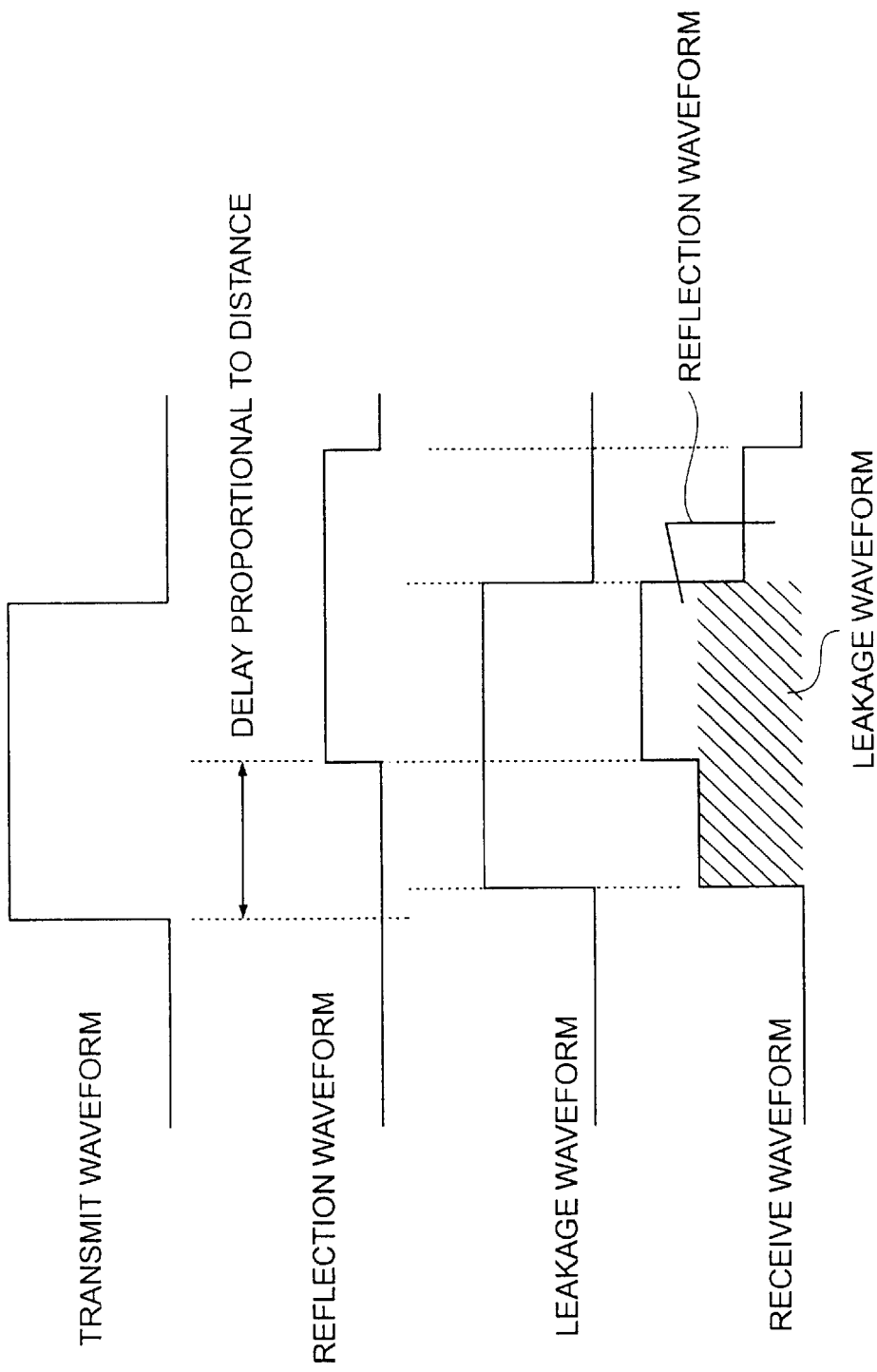

PULSE RADAR DEVICE

BACKGROUND OF THE INVENTION

1. Field of the Invention

The present invention relates to a pulse radar device which measures a distance to a target object.

2. Description of the Related Art

Up to now, there has been well known a pulse radar device which transmits a transmit signal from an antenna and receives a reflection signal that reflects a plurality of target objects (target) to detect the presence of the respective target objects and to measure the positions of the target objects.

In the pulse radar device, signal processing is conducted by using the received reflection signal, but in fact, since the reflection signal is received from a radome located in the pulse radar device, there is required a signal processing unit for separating and extracting the target object.

FIG. 26 is a block diagram showing a conventional pulse radar device disclosed in, for example, Japanese Patent Application Laid-open No. Hei 7-72237. In FIG. 26, the pulse radar device includes a transmitting means 2601, a control means 2602, a receiving means 2603, sampling means 2604, adding/storing means 2605 and judging means 2606.

The transmitting means 2601 periodically outputs (transmits) a pulse-like signal (transmit signal) toward the target object in accordance with an output command from the control means 2602.

The transmit signal transmitted from the pulse radar device is reflected by a plurality of target objects and then inputted to the receiving means 2603. The receiving means 2603 continuously receives a receive signal (pulse signal) including the reflection signals from the respective target objects and binary-codes the receive signal.

The sampling means 2604 samples the binary-coded pulse signal to 0 or 1 in accordance with the command of the control means 2602, and inputs the sampling value at each sampling point to the adding/storing means 2605 corresponding to the respective sampling points.

The adding/storing means 2605 adds a sampling value in accordance with the number of times of transmission of a transmission signal from the transmitting means 2601.

The judging means 2606 compares the respective normalized addition values obtained by dividing the respective addition values by the adding/storing means 2605 by the number of times of addition with a predetermined detection threshold value (threshold value) to judge the presence/absence of a reflection signal from a target object on the basis of the magnitude relationship of a comparison result. Also, the judging means 2606 judges the presence/absence of the target object in accordance with the judgment result of whether the reflection signal is present or absent, and calculates the distance to the target object in accordance with the judgment result.

In the conventional device, in general, a transmit pulse width is set to 66.7 ns (corresponding to 10 m in distance).

FIG. 27 is a timing chart showing transmit/receive waveforms together with a reflection wave and a leakage waveform.

For example, in the case where the target object exists within 10 m, and the isolation of transmit/receive is low such that a leakage wave exists or a reflection signal from a radome exists in the receive signal, the receive signal is detected as shown in FIG. 27, in a state where the leakage signal, the reflection signal (not shown) from the object fixed onto the pulse radar device such as a radome, a noise signal such as a noise (not shown) which exists even in non-transmission, and the reflection signal from the target object are superimposed on each other in waveform.

Therefore, even if the detection threshold value is set on the basis of only the receive level (noise level) in the non-transmission, and the reflection signal from the target object is going to be discriminated, only the rising of the leakage waveform or the reflection waveform such as the radome can be detected, and therefore the rising of the reflection waveform from the target object cannot be detected.

From the above-mentioned viewpoints, in the conventional device shown in FIG. 26, it is difficult to detect the target object at a short distance and measure the distance.

The countermeasures for solving the above problems are disclosed in various documents up to now.

For example, there is discloses a method with a transmit pulse width set to 350 ps (far shorter than that in the above-mentioned conventional device) in a document of 1998 (W. Weidmann and D. Steinbuch, "High Resolution Radar for Short Range Automotive Applications", 28th European Microwave Conference Amsterdam, 1998).

However, this method cannot be used within the existing radio wave law because the leakage waveform and the reflection waveform of the target object are superimposed on each other only when the distance to the target object is about 5 cm or shorter, and the above-mentioned problem is almost solved but a wide frequency occupied band width is required.

Also, Japanese Patent Application Laid-open No. Hei 10-62518 discloses a method of canceling the leakage waveform by using the transmit waveform.

However, this method is difficult to cope with a difference in the period of time from the transmission of the transmit signal to the receive of the leakage waveform due to a difference of the use conditions or with a difference in the magnitude of the leakage waveform, and must adjust the pulse radar device in accordance with the circumstances.

As described above, in the conventional pulse radar device, in the case where a noise signal exists in the receive signal, since the receive signal is detected in a state where the noise signal and the reflection signal from the target object are superimposed on each other in waveform, even if the detection threshold value is set only on the basis of the receive level (noise level) in the non-transmission to discriminate the reflection signal from the target object, the rising of the reflection waveform from the target object cannot be detected, resulting in such a problem that it is difficult to measure the distance.

Also, when a method of shortening the transmit pulse width to 350 ps is applied, since the leakage waveform and the reflection waveform of the target object are superimposed on each other only when the distance to the target object is about 5 cm or shorter, the above-mentioned problem is almost solved, but there arises such a problem that the wide frequency occupied band width is required, and this method cannot be: used within the limits of the existing radio wave law.

In addition, when a method of canceling the leakage waveform by using the transmit waveform is applied, it is difficult to cope with a difference in the period of time from the transmit of the transmit signal to the receive of the leakage waveform due to a difference in the use conditions, and with a difference in the magnitude of the leakage waveform, and there arises such a problem that the pulse radar device must be adjusted in accordance with the circumstances.

SUMMARY OF THE INVENTION

The present invention has been made to solve the above-mentioned problem, and therefore an object of the present invention is to provide a pulse radar device which is capable of discriminating a reflection waveform from a target object to measure a distance to the target object even if a noise signal exists in a receive signal.

Another object of the present invention is to provide a pulse radar device which is capable of accurately detecting a target object within the limits of the existing radio wave law, in accordance with a change in a receive signal due to a phase difference of a leakage signal between the transmit and the receive, a reflection signal from the object fixed to the pulse radar device such as a radome, a noise signal such as a noise component which exists even in the non-transmission with respect to the reflection signal from the target object.

Still another object of the present invention is to provide a pulse radar device which is capable of coping with a difference in the period of time from the transmit of a transmit signal to the receive of a leakage waveform due to a difference in the use conditions and with a difference in the magnitude of the leakage waveform without adjusting the pulse radar device.

According to the present invention, there is provided a pulse radar device, comprising a timing control unit that controls a transmit interval of a pulse signal, a transmitting unit that transmits the pulse signal, a receiving unit that receives a receive signal including a reflection signal component from a target object and a noise component. And further provided is a receive signal change detecting unit that detects a change in the assembly of the receive signals of the assembly of the pulse signals as many as a given number of times of transmissions which are transmitted during a first transmit interval and the assembly of the pulse signals as many as a given number of times of transmissions which are transmitted during a second transmit interval. And further provided is a reflection signal rising detecting unit that detects a rising time point of the reflection signal component on the basis of the change in the assembly of the receive signals, and a ranging/detecting unit that obtains a distance value on the basis of the rising time point of the reflection signal and judges the presence of the target object.

Therefore, even if a leakage signal component or a reflection signal from a radome or the like exists in the receive signal, the target object can be accurately detected.

BRIEF DESCRIPTION OF THE DRAWINGS

These and other objects and advantages of this invention will become more fully apparent from the following detailed description taken with the accompanying drawings in which:

FIG. 5 is a flowchart showing an operation in accordance with the first embodiment of the present invention;

FIG. 6 is an explanatory diagram showing the operation in accordance with the first embodiment of the present invention;

FIG. 7 is a flowchart showing the operation in accordance with the first embodiment of the present invention;

FIG. 8 is an explanatory diagram showing the operation in accordance with the first embodiment of the present invention;

FIG. 27 is a timing chart showing a pulse waveform of a transmit/receive signal in the conventional pulse radar device.

DETAILED DESCRIPTION OF THE PREFERRED EMBODIMENTS

Now, a description will be given in more detail of preferred embodiments of the present invention with reference to the accompanying drawings.

First Embodiment

Figure 1:
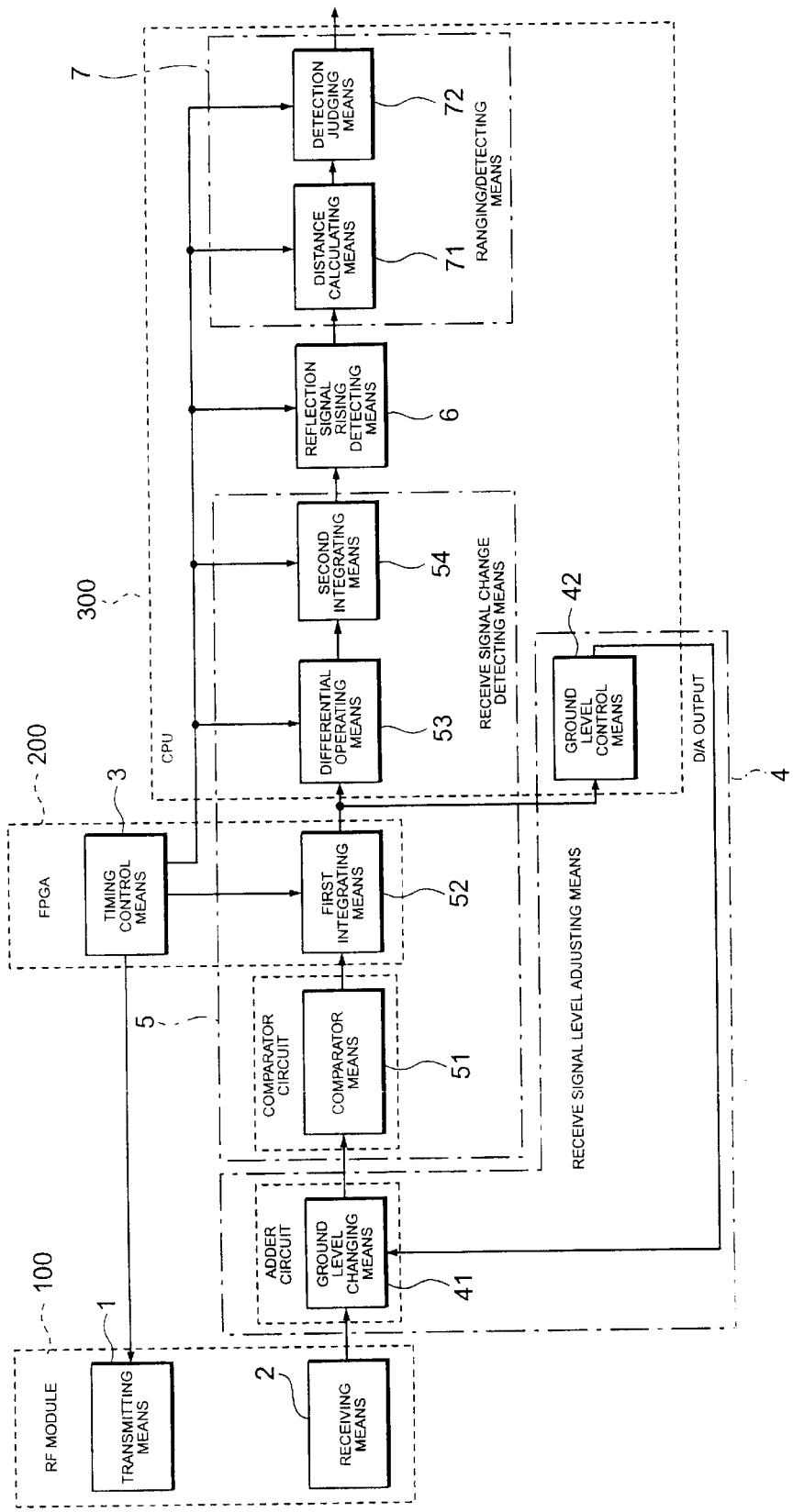
FIG. 1 is a structural block diagram showing a first embodiment of the present invention.

Hereinafter, a first embodiment of the present invention will be described in more detail with reference to the accompanying drawings. FIG. 1 is a structural block diagram showing a first embodiment of the present invention.

In FIG. 1, a pulse radar device includes an RF module 100 including a transmitting means 1 and a receiving means 2, an FPGA (program setting means) 200 including a timing control means 3, a receive signal level adjusting means 4, a receive signal change detecting means 5, and a CPU 300 including a part of the receive signal change detecting means 5, a reflection signal rising detecting means 6 and a ranging/detecting means 7.

The receive signal level adjusting means 4 is made up of a ground level changing means 41 and a ground level control means 42.

The receive signal change detecting means 5 is made up of a comparator means 51, a first integrating means 52, a differential operating means 53 and a second integrating means 54.

The ranging/detecting means 7 is made up of a distance calculating means 71 and a detection judging means 72.

The RF module 100 transmits a pulse electromagnetic wave (for example, the center frequency of 24.125 GHz) of a given width (for example, 96 ns) in a given period (for example, 1024 ns) in the transmitting means 1. In the receiving means 2, the RF module 100 receives a reflection wave of an electromagnetic wave, which is transmitted by the transmitting means 1 and reflected by a target object (target), a peripheral object or the like.

Figure 2:
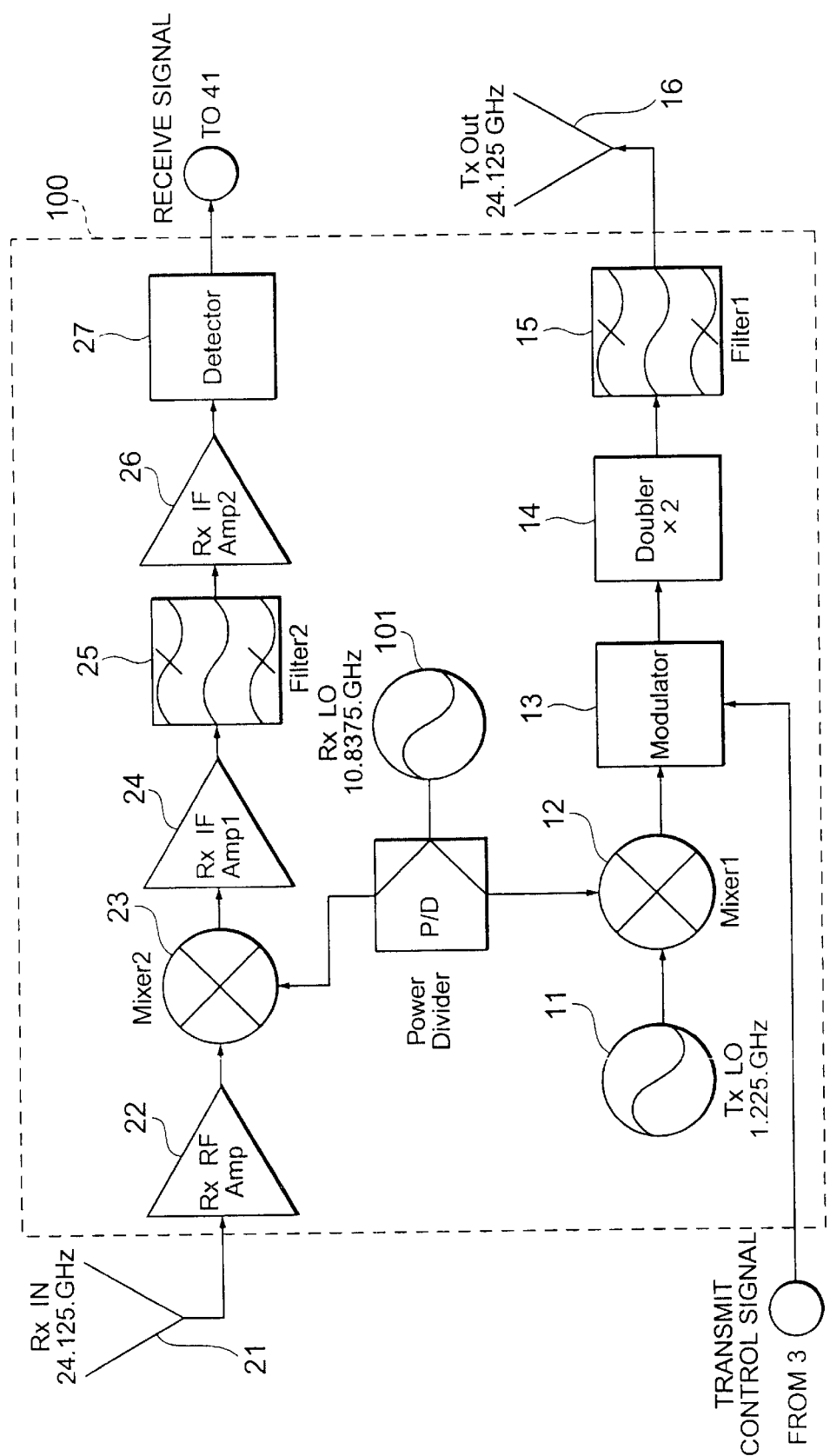
FIG. 2 is a structural block diagram showing the first embodiment of the present invention.

Subsequently, the operation of the RF module 100 in accordance with the first embodiment of the present invention will be described with reference to FIG. 2. FIG. 2 is a structural block diagram showing the RF module 100 in accordance with the first embodiment of the present invention.

In FIG. 2, the transmitting means 1 includes a Tx LO (oscillator) 11, a mixer 12, a modulator 13, a doubler 14, a filter 15 and a transmit antenna 16.

The receiving means 2 includes a receive antenna 21, an amplifier 22, a mixer 23, an amplifier 24, a filter 25, an amplifier 26 and a detector 27.

Also, the RF module 100 includes an oscillator 101 associated with the transmitting means 1 and the receiving means 2. The oscillator 101 includes a power divider that supplies an oscillation power to the respective mixers 12 and 23.

In FIG. 2, after a signal of 10.8375 GHz in the oscillator (Rx LO) 101 has been mixed with a signal of 1.225 GHz from the oscillator 11 by the mixer 12, the mixed signal becomes a pulse signal on the basis of the transmit control signal from the timing control means 3 by the modulator 13.

Subsequently, the pulse signal becomes a signal of 24.125 GHz by the filter 15 after having been multiplied by two by the doubler 14, and is then transmitted (radiated) to the external from the transmit antenna 16 as a transmit signal (electromagnetic wave).

The transmit signal is reflected by a target object, a peripheral object or the like and becomes a reflection signal, and then it is received by the receive antenna 21 and amplified by the amplifier 22. Thereafter, the transmit signal is mixed with a signal from the oscillator 101 by the mixer 23 and reduced down to an intermediate frequency.

Subsequently, the receive signal reduced in the frequency is envelope-detected by the detector 27 through the amplifier 24, the filter 25 and the amplifier 26 and becomes a receive signal. In this way, the receive signal is inputted to the ground level changing means 41 of the adder circuit.

In FIG. 1, the ground level changing means 41 changes the ground level of the receive signal and inputs the receive signal to the comparator means 51 in accordance with a command from the ground level control means 42 in a CPU that will be described later so that the receive signal is not saturated.

The comparator means 51 binary-codes the receive signal and inputs the receive signal to the first integrating means 52 in the FPGA.

Subsequently, the operation of the FPGA 200 in accordance with the first embodiment of the present invention will be described with reference to FIGS. 3 and 4.

Figure 3:
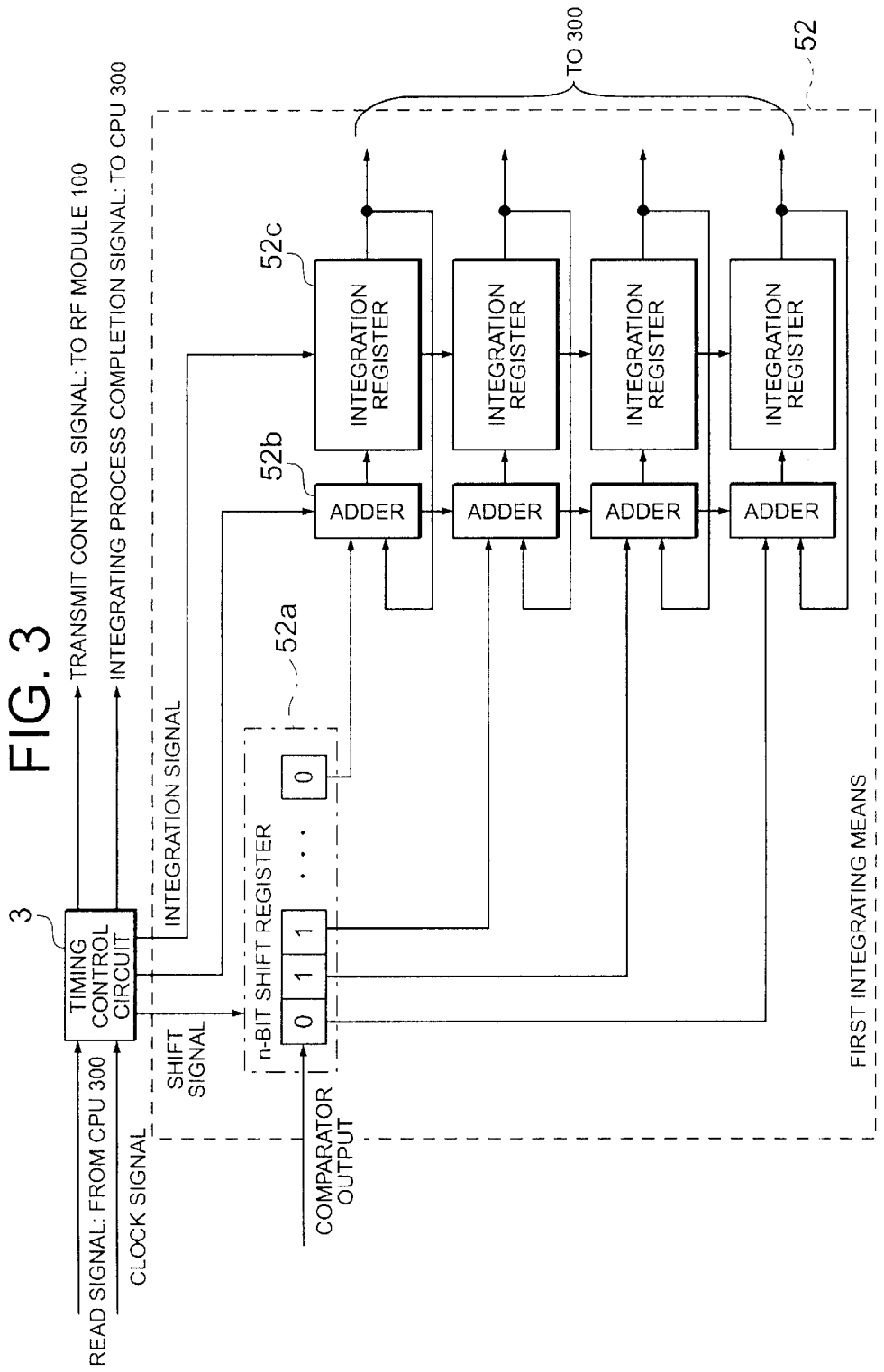
FIG. 3 is a structural block diagram showing the first embodiment of the present invention.
Figure 4:
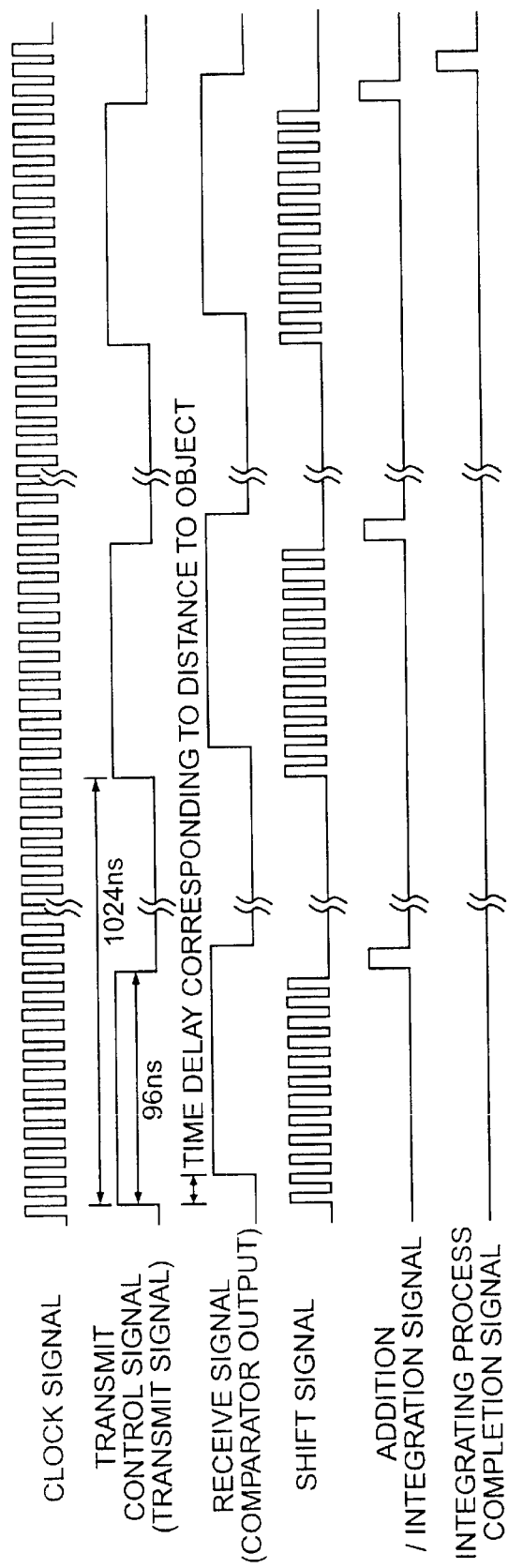
FIG. 4 is a timing chart showing the respective signal waveforms in accordance with the first embodiment of the present invention.

FIG. 3 is a structural block diagram showing the FPGA 200 in FIG. 1, and FIG. 4 is a timing charting showing the waveforms of the various signals inputted/outputted or generated in the FPGA 200 in accordance with the first embodiment of the present invention.

In FIG. 3, the first integrating means 52 includes an n-bit shift register 52a, and adders 52b and integration registers 52c corresponding to the respective bits.

The timing control means 3 is inputted with a read signal from the CPU 300 and a clock signal (for example, 125 MHz=8 ns period) from an oscillator (not shown) connected to the FPGA 200.

The timing control means 3 generates a transmit control signal (for example, width of 96 ns and period of 1024 ns) controlling the transmit timing (on/off) of the transmit signal (electromagnetic wave) at the transmitting means 1 on the basis of the clock signal, and inputs the transmit control signal to the transmitting means 1. The transmitting means 1 radiates the transmit signal at a transmit timing of the transmit control signal.

Also, at the same time when the transmit control signal is outputted, the timing control means 3 outputs the shift signals the number of which corresponds to the bit number n to the shift registers 52a in the first integrating means 52, and also outputs addition signals to the adders 52b and integration signals to the integration registers 52c.

The first integrating means 52 first stores the binary-coded receive signals into the respective bits (sampling timing) of the shift registers 52a (sampling) while shifting the shift registers 52a one bit by one bit in accordance with the rising of the pulse of the shift signal.

Also, the respective adders 52b add the binary-coded receive signals stored in the shift registers 52a and the contents of the integration register 52c bit by bit (every sampling timing) in accordance with the addition signals, and outputs the added values.

Then, the respective integration registers 52c record the addition values from the adders 52b in accordance with the integration signals, and output the integration values (addition values) recorded in the integration registers 52c to the CPU 300 when receiving a request from the CPU 300.

The timing control means 3 repeats the above processing of the first integrating means 52 every time the transmit signal is transmitted. When the timing control means 3 repeats a given number of times of transmission (for example, 1000 times as one section), the timing control means 3 generates an integration process completion signal indicative of the process completion of the first integrating means 52 and then inputs the integration process completion signal to the CPU 300.

The CPU 300 reads the respective integration values from the respective integration registers 52c upon receiving the integrating process completion signal from the timing control means 3.

Next, the operation of the respective means 6, 42, 53, 54, 71 and 72 in the CPU 300 in accordance with the first embodiment of the present invention will be described with reference to a flowchart shown in FIG. 5.

In FIG. 5, the CPU 300 itself is first initialized (Step 501), and the data is initialized (Step 502).

Subsequently, it is judged whether the integrating process completion signal is received from the first integrating means 52, or not (Step 503), and if it is judged that the integrating process completion signal is received (that is, YES), the data input process is conducted in the FPGA 200, and the integration values at the respective sampling timings (the respective bits of the shift registers 52a) are stored in a two-dimensional arrangement FPGA [i] [j] (Step 504).

In this example, i is the sampling timing (i=0 to M; M is the number of bits of the shift register 52a), and j is the number of repeats (the number of times of integration) in the first integrating means 52 (j=0 to N−1). For example, when the transmit signal is transmitted once, transmission is repeated 1000 times as one section, and subsequently, when the transmit signal up to 60000 times is used, the number of repeats indicates the order of storages (60 times, j=0 to 59).

Then, it is judged whether the number of times of receives of the integrating process completion signals from the first integrating means 52 reaches a given number of times (in this example, 60 times), or not (Step 505), and if it is judged that the number of times of receives does not reach the given number of times (that, is NO), the operation returns to Step 503. If it is judged that the number of times of receives reaches the given number of times (that is, YES), the control process is conducted by the ground level control means 42 (Step 506).

In Step 506, the ground level control means 42 calculates the mean value of the integration values at the respective sampling timings and compares the mean value with a predetermined threshold value to output a control signal for adjusting the ground level of the receive signal to the ground level changing means 41 in accordance with the comparison result.

Subsequently, the differential operating means 53 calls the integration values at the respective sampling timings, respectively, and calculates a difference between the present integration value and the previous integration value (if the present value is obtained from the 1001st transmission to the 2000th transmission, the previous value is obtained from the first transmission to the 1000th transmission (Step 507).

Subsequently, the second integrating means 54 integrates all of the calculated result of the differential operating means 53 by the number of repeats (in this example, 60 times) by the first integrating means 52 at each of the sampling timings (Step 508).

Then, the reflection signal rising detecting means 6 compares the integration value of the second integrating means 54 at the respective sampling timings with the predetermined detection threshold value and detects a sampling timing closest to a transmit time among the sampling timings of the integration values that exceed the detection threshold value (Step 509).

Also, the distance calculating means 71 calculates a distance to the reflection object on the basis of the sampling timing detected in Step 509 (Step 510).

Also, the detection judging means 72 conducts the judging process of whether the target object exists, or not, on the basis of the distance calculated in Step 510 (Step 511).

Finally, it is confirmed whether 50 ns of a processing cycle elapses or not (Step 512), and if it is judged that the processing cycle elapses (that is, YES), the operation returns to a data initializing process (Step 502), and the above-mentioned operation repeats.

Subsequently, the ground level control process in accordance with the first embodiment of the present invention will be described with reference to the explanatory diagram of FIG. 6.

In FIG. 6, a receive signal includes a noise component (a leakage signal component, a reflection signal component (not shown) from an object fixed to the pulse radar device, a noise component (not shown) that exists even during non-transmission, etc.) and a reflection signal component from the target object.

However, for example, when the detection threshold value is set at a point of a dotted line A and binary-coded, it becomes always "1" regardless of the presence/absence of the target object in the periphery, and the receive signal does not vary with the result that the target object cannot be detected from the variation of the receive signal.

Therefore, the ground level control process 42 adjusts the level of the entire receive signal by adjusting the ground level of the receive signal. As a result, the detection threshold value is set at a position of a dotted line B, and even if the value is binary-coded, the variation of the receive signal can be recognized.

Next, the operation of the ground level control means 42 in accordance with the first embodiment of the present invention will be described in more detail with reference to a flowchart shown in FIG. 7.

In FIG. 7, a variable i and Sum[i] and j are initialized (Step 701, 702, 703), and a value of the two-dimensional arrangement FPGA[i] [j] (j=0 to 59) is added to a value of the sum Sum[i] of the integration value obtained from performing integrations 60 times at the respective sampling timings (Step 704).

Subsequently, the variable j is incremented (Step 705), the variable j and the number of times of integrations N at the first integrating means 52 are compared with each other, and it is judged whether the variable j is smaller than the number of times of integrations N, or not (Step 706).

In Step 706, if it is judged that j<N (that is, YES), the operation returns to Step 704, whereas if it is judged j N (that, is NO), the variable i is incremented (Step 707).

Then, the variable i and the number of bits M of the shift register of the first integrating means 52 are compared with each other, and it is judged whether the variable i is smaller than the number of bits M, or not (Step 708).

If it is judged that i<M (that is, YES) in Step 708, the operation returns to Step 702. If it is judged that i M (that is, NO), the sum Sum[i] of the integration values obtained from performing integrations 60times at the respective sampling timings is calculated, and the mean value SumMean of the sum Sum[i] of the calculated integration values is calculated (Step 709).

Subsequently, the mean value SumMean and a predetermined value SUMMEAN 1 are compared with each other, and it is judged whether the mean value SumMean is smaller than the predetermined value SUMMEAN 1, or not (Step 710).

In Step 710, it is judged that SumMean SUMMEAN 1 (that is, NO), a set value of the ground level of the ground level changing means 41 is reduced by α from the previous value (Step 711).

On the other hand, in Step 710, if it is judged that SumMean<SUMMEAN 1 (that is, YES), the mean value SumMean and the predetermined value SUMMEAN 2 (<SUMMEAN 1) are compared with each other, and it is judged whether the mean value SumMean is larger than the predetermined value SUMMEAN 2, or not (Step 712).

In Step 712, if it is judged that SumMean SUMMEAN 2 (that, is NO), the set value of the ground level of the ground level changing means 41 is increased by α from the previous value (Step 713).

On the other hand, it is judged that SumMean>SUMMEAN 2 (that is, YES), the ground level of the ground level changing means 41 is maintained to the set value (Step 714).

The ground level control means 42 D/A converts the control signal for adjusting the ground level in correspondence with the judgment on the basis of the control values in the above-mentioned respective Steps 711, 713 and 714, inputs the control signal to the ground level changing means 41 (Step 715), and completes the control process shown in FIG. 7.

The ground level changing means 41 adds the control signal from the ground level control means 42 and the receive signal from the receiving means 2 to adjust the ground level of the receive signal.

Next, a description will be given of the respective processing operations of the differential operating means 53, the second integrating means 54, the reflection signal rising detecting means 6, the distance calculating means 71 and the detection judging means 72 in the CPU 300 in the order with reference to FIGS. 8 to 15. FIGS. 8 to 10 are explanatory diagrams showing the operation in the first embodiment of the present invention, and FIGS. 11 to 15 are flowcharts showing the operation in the first embodiment of the present invention.

In the case where a relative distance between the target object and the pulse radar device changes, the magnitude of the receive signal changes at the sampling timing corresponding to a portion where the leakage signal component and the reflection signal component from the target object in the periphery are superimposed on each other as shown in FIG. 8.

On the other hand, the magnitude of the receive signal is substantially constant at the sampling timing corresponding to the portion of only the leakage signal component. The magnitudes of the receive signals at the respective sampling timings are graphed as shown in FIGS. 9A to 9D.

Figure 9A:
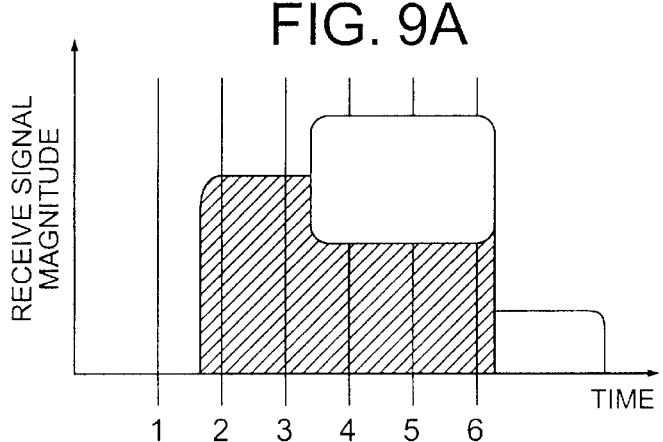
FIGS. 9A to 9D are explanatory diagrams showing the operation in accordance with the first embodiment of the present invention, respectively.
Figure 9B:
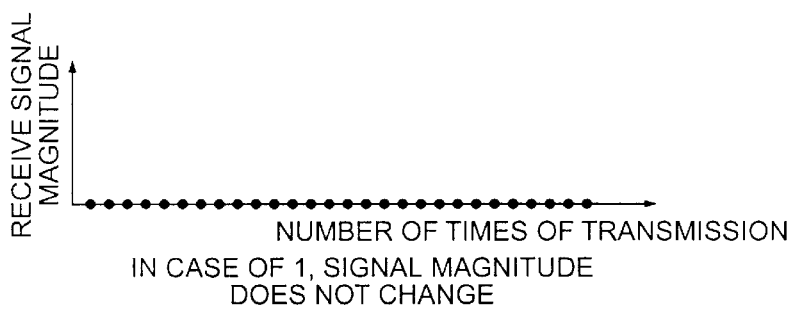
Figure 9C:
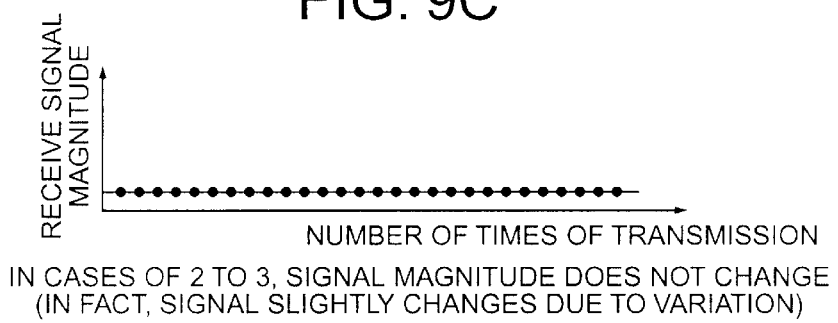
Figure 9D:
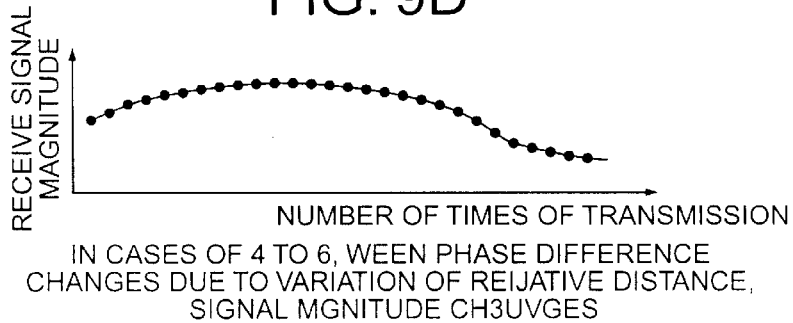
Figure 10:
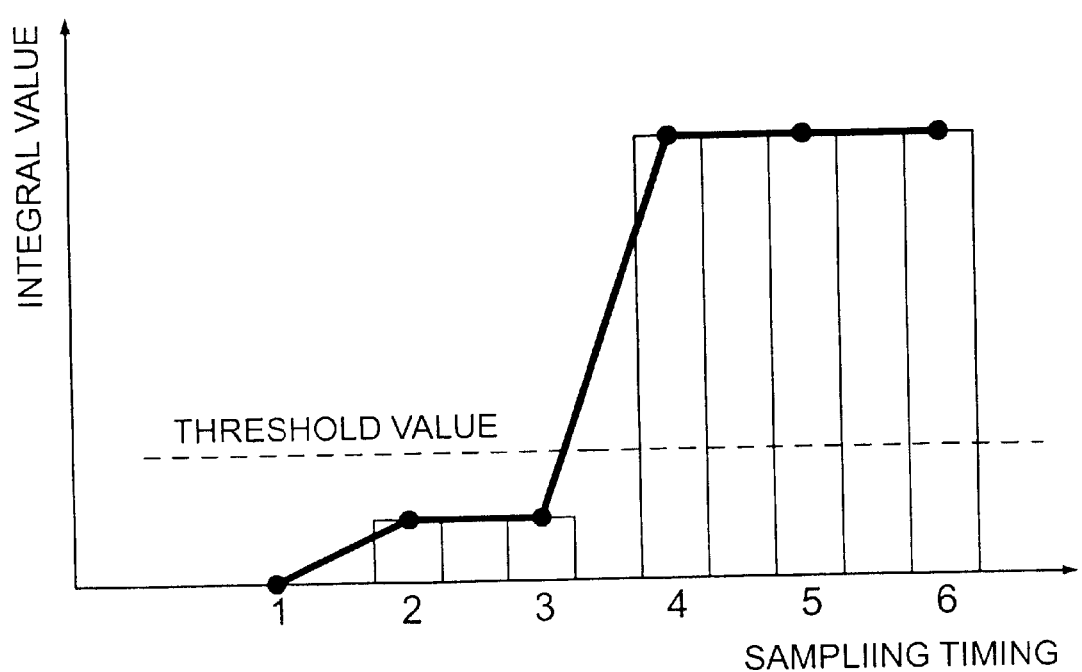
FIG. 10 is an explanatory diagram showing the operation in accordance with the first embodiment of the present invention.

FIG. 9A shows a change of the receive signal with a time, and FIGS. 9B to 9D show changes of the receive signals with respect to the number of times of transmissions.

That is, in the case where the sampling timing is "1", the magnitude of the receive signal does not change as shown in FIG. 9B.

Also, in the case where the sampling timing is "2", or "3", the receive signal does not change as shown in FIG. 9C. In fact, since the receive signal varies, the receive signal slightly changes but the magnitude of the receive signal hardly changes.

Also, in the case where the sampling timing is "4" to "6", the magnitude of the receive signal changes as shown in FIG. 9D where a phase difference changes due to the variation of the relative distance.

Therefore, when the absolute values of the magnitudes of the receive signals at the respective sampling timings are integrated together (the integration value at the second integrating means), the results shown in FIG. 10 are obtained. The integration value is compared with the predetermined detection threshold value, thereby being capable of identifying the leakage signal component and the reflection signal component and accurately detecting the target object.

First, the process operation of the differential operating means 53 will be described in more detail with reference to FIG. 11.

First, the variable i is initially set to "0", the variable j is initially set to "1" (Step 1101), and the differential absolute value between the integration values FPGA [i] [j] at the respective sampling timings and the previous integration values FPGA [i] [j−1] are calculated, and the differential absolute value is substituted for the differential absolute value Diff[i] [j−1] of the integration value at the respective sampling timings (Step 1102).

Then, the variable j is incremented (Step 1103), and the variable j and the number of times of integrations N of the integrating means 52 are compared with each other, and it is judged whether the variable j is equal to or more than the number of times of integrations N, or not (Step 1104).

In Step 1104, if it is judged that j<N (that, is NO), the operation returns to Step 1102, whereas if it is judged that j N (that is, YES), the variable i is incremented (Step 1105).

Subsequently, the variable i is compared with the number of bits M of the shift register in the first integrating means 52, and it is judged whether the variable i is equal to or more than the number of bits M, or not (Step 1106).

In Step 1106, if it is judged that i<M (that, is NO), the variable i is set to "1" (Step 1107), and the operation returns to Step 1102. If it is judged that i≧M (that is, YES), the differential operating process shown in FIG. 11 is completed.

As described above, the differential operating means 53 calculates the differential absolute value of the integration values of the first integrating means 52 at the previous time and the present time for each of the sampling timings.

Next, the processing operation of the second integrating means 54 will be described in more detail with reference to FIG. 12.

Figure 12:
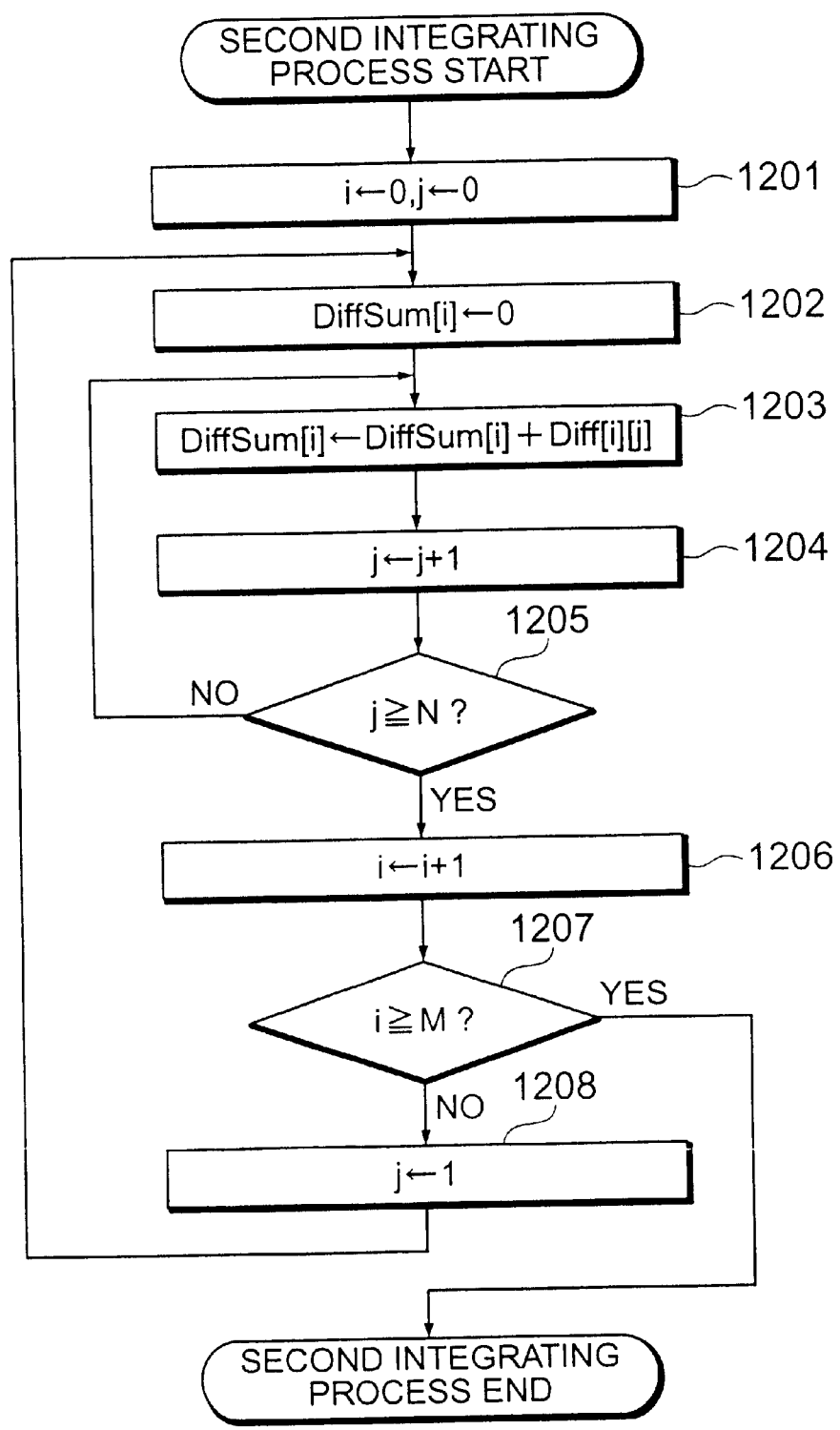
FIG. 12 is a flowchart showing the operation in accordance with the first embodiment of the present invention.

In FIG. 12, the variable i and j are initially set to "0" (Step 1201), and the sum DiffSum[i] of the differential absolute values of the integration values at the respective sampling timings are initially set to "0" (Step 1202).

Figure 11:
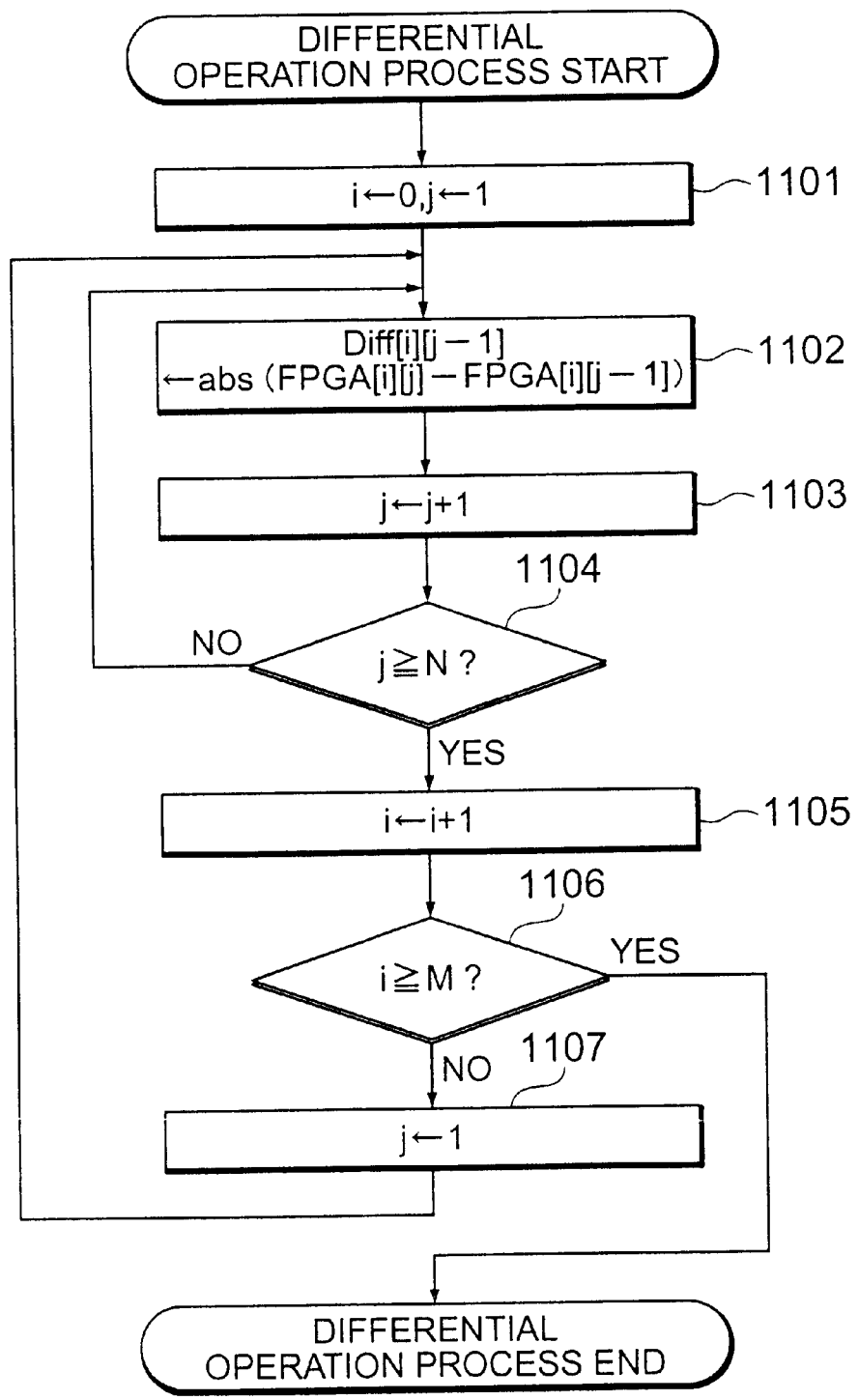
FIG. 11 is an explanatory diagram showing the operation in accordance with the first embodiment of the present invention.

Then, the differential absolute value Diff[i] [j] of the integration values at the respective sampling timings which are calculated through the differential operating process shown in FIG. 11 is added to DiffSum[i] (Step 1203), and the variable j is incremented (Step 1204).

Subsequently, the variable j and the number of times of integrations N of the first integrating means 52 are compared with each other, and it is judged whether the variable j is equal to or more than the number of times of integrations N, or not (Step 1205). If it is judged that j<N (that, is NO), the operation returns to Step 1203.

In Step 1205, if it is judged that j N (that is, YES), the variable i is incremented (Step 1206), and the variable i and the number of bits M of the shift register in the first integrating means 52 are compared with each other, and it is judged that the variable i is equal to or more than the number of bits M, or not (Step 1207).

In Step 1207, if it is judged that variable i<M (that, is NO), the variable j is set to "1" (Step 1208), and the operation returns to Step 1202. If it is judged that i M (that is, YES), the second integrating process shown in FIG. 12 is completed.

As described above, the second integrating means 54 calculates the sum of the differential absolute values at the respective sampling timings.

Next, the processing operation of the reflection signal rising detecting means 6 will be described in more detail with reference to FIG. 13.

Figure 13:
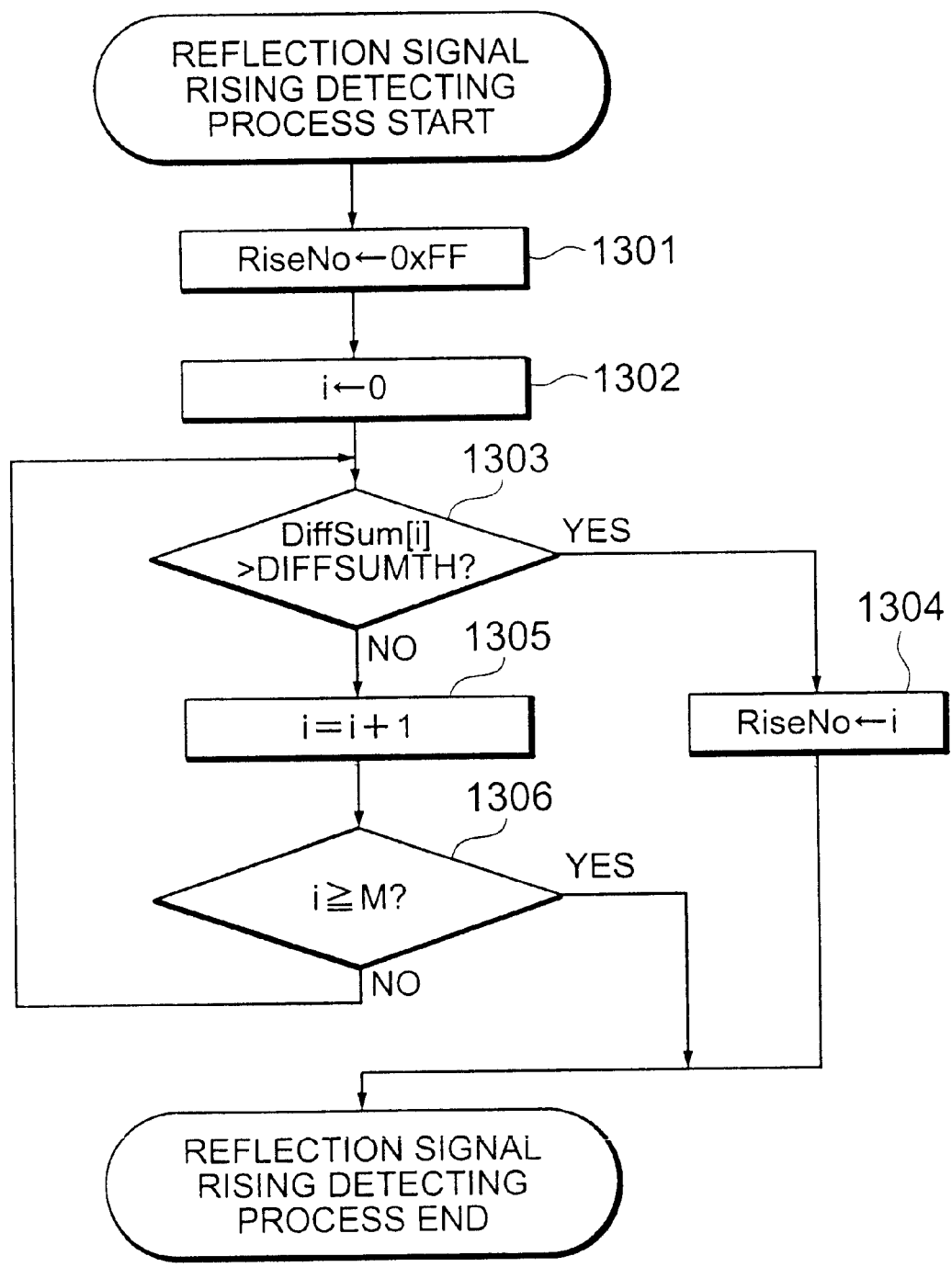
FIG. 13 is a flowchart showing the operation in accordance with the first embodiment of the present invention.

In FIG. 13, "255 (0xFF, which is given in hexadecimal)" is initially set at numeral (sampling timing No.) RiseNo added to the respective sampling timings (Step 1301), and "0" is initially set at the variable i (Step 1302).

Subsequently, the sum DiffSum[i] of the differential absolute values of the integration values at the respective sampling timings and a predetermined value DIFFSUMTH are compared with each other, and it is judged whether the sum DiffSum[i] of the differential absolute values are larger than the predetermined value, or not (Step 1303).

If it is judged in Step 1303 that DiffSum[i]>FIFFSUMTH (that is, YES), the variable i is substituted for the sampling timing No. RiseNo (Step 1304), and the reflection signal rising detecting process shown in FIG. 13 is completed.

On the other hand, if it is judged DiffSum[i] DIFF-SUMTH (that, is NO) in Step 1303, the variable i is incremented (Step 1305), and the variable i and the number of bits M of the shift register in the first integrating means 52 are compared with each other, and it is judged whether the variable i is equal to or more than the number of bits M, or not (Step 1306).

In Step 1306, if it is judged that i≧M (that is, YES), the reflection signal rising detecting process shown in FIG. 13 is completed, whereas if it is judged that i<M (that, is NO), the operation returns to Step 1303.

As described above, the reflection signal rising detecting means 6 compares the sum of the differential absolute values of the integration values at the respective sampling timings with the predetermined DIFFSUMTH in the order closer to the rising of the transmission, and calculates the sampling timing No. (the sampling timing closest to the rising of the transmit signal) which first exceeds the predetermined value DIFFSUMTH.

The rising of the reflection signal can be discriminated from the sampling timing No. RiseNo thus calculated.

Next, the processing operation of the distance calculating means 71 will be described in more detail with reference to FIG. 14.

Figure 14:
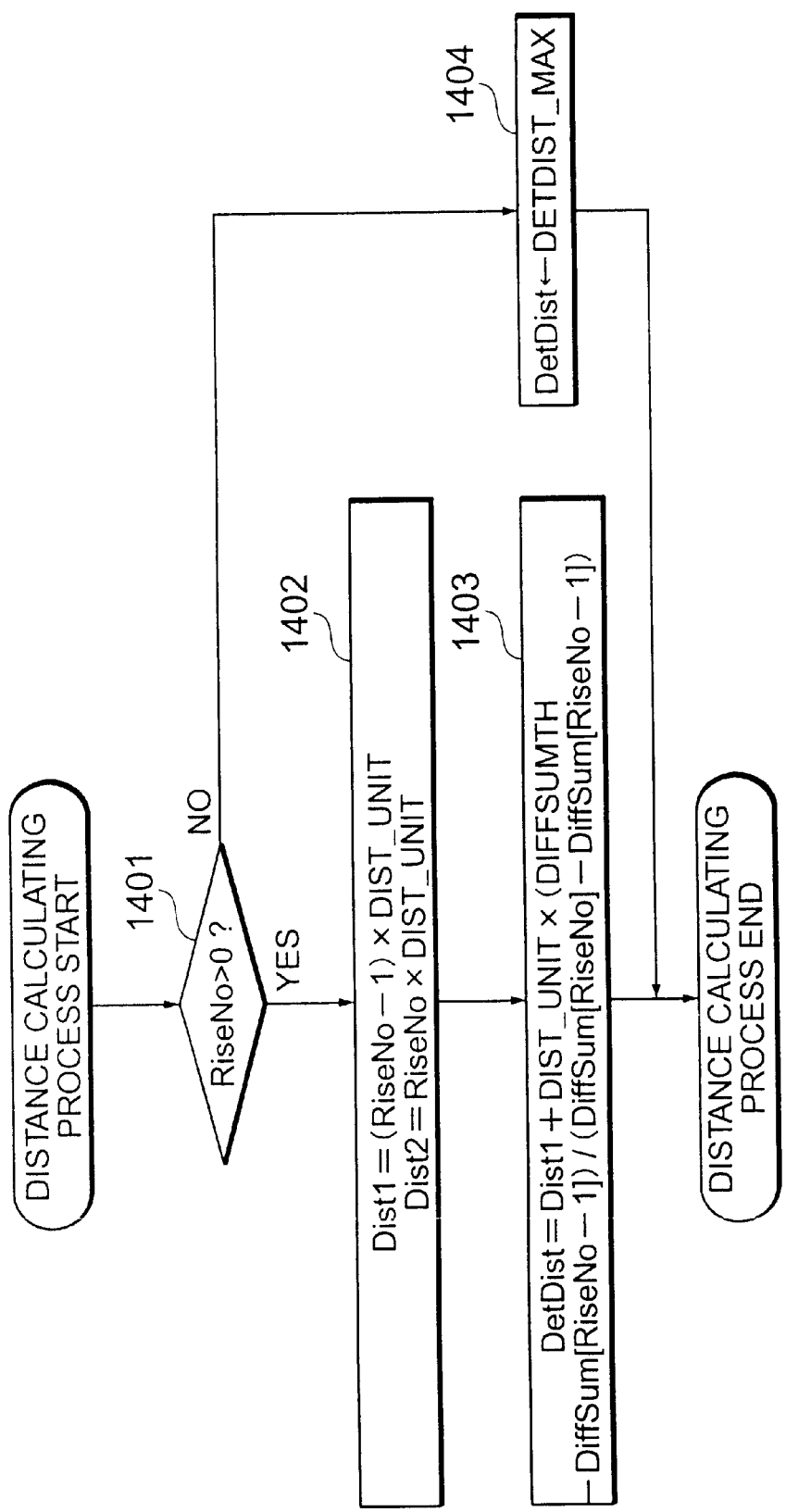
FIG. 14 is a flowchart showing the operation in accordance with the first embodiment of the present invention.

In FIG. 14, it is first judged whether the sampling timing No. RiseNo calculated in the reflection signal rising detecting process is larger than 0, or not (Step 1401).

In Step 1401, if it is judged that RiseNo>0 (that is, YES), the previous distance Dist1 and the present distance Dist 2 are calculated in accordance with the following expressions (1) and (2) (Step 1402).

[Equation 1]

$$Dist1 = (RiseNo-1) \times DIST\_UNIT \quad (1)$$

$$Dist2 = RiseNo \times DIST\_UNIT \quad (2)$$

Subsequently, the previous distance Dist1 and the present distance Dist2 are linearly interpolated to calculate the detection distance DetDist (Step 1403).

[Equation 2]

$$DetDist = Dist1 + Dist\_Unit \times (DIFFSUMTH - DiffSum[RiseNo-1])/(DiffSum[RiseNo-1]) \quad (3)$$

In the expressions (1) to (3), Dist_Unit is a distance corresponding to the sampling interval.

As described above, in Step 1403, the detection distance detDist is calculated to complete the distance calculating process shown in FIG. 14.

On the other hand, in Step 1401, if it is judged that RiseNo 0 (that, is NO), the maximum distance DETDIST_MAX is substituted for the detection distance DetDist (Step 1404) to complete the distance calculating process shown in FIG. 14.

As described above, the distance calculating means 71 calculates a distance from a sampling timing No. at the sampling timing at which the magnitude of the receive signal first exceeds the detection threshold value.

Next, the processing operation by the detection judging means 72 will be described in more detail with reference FIG. 15.

Figure 15:
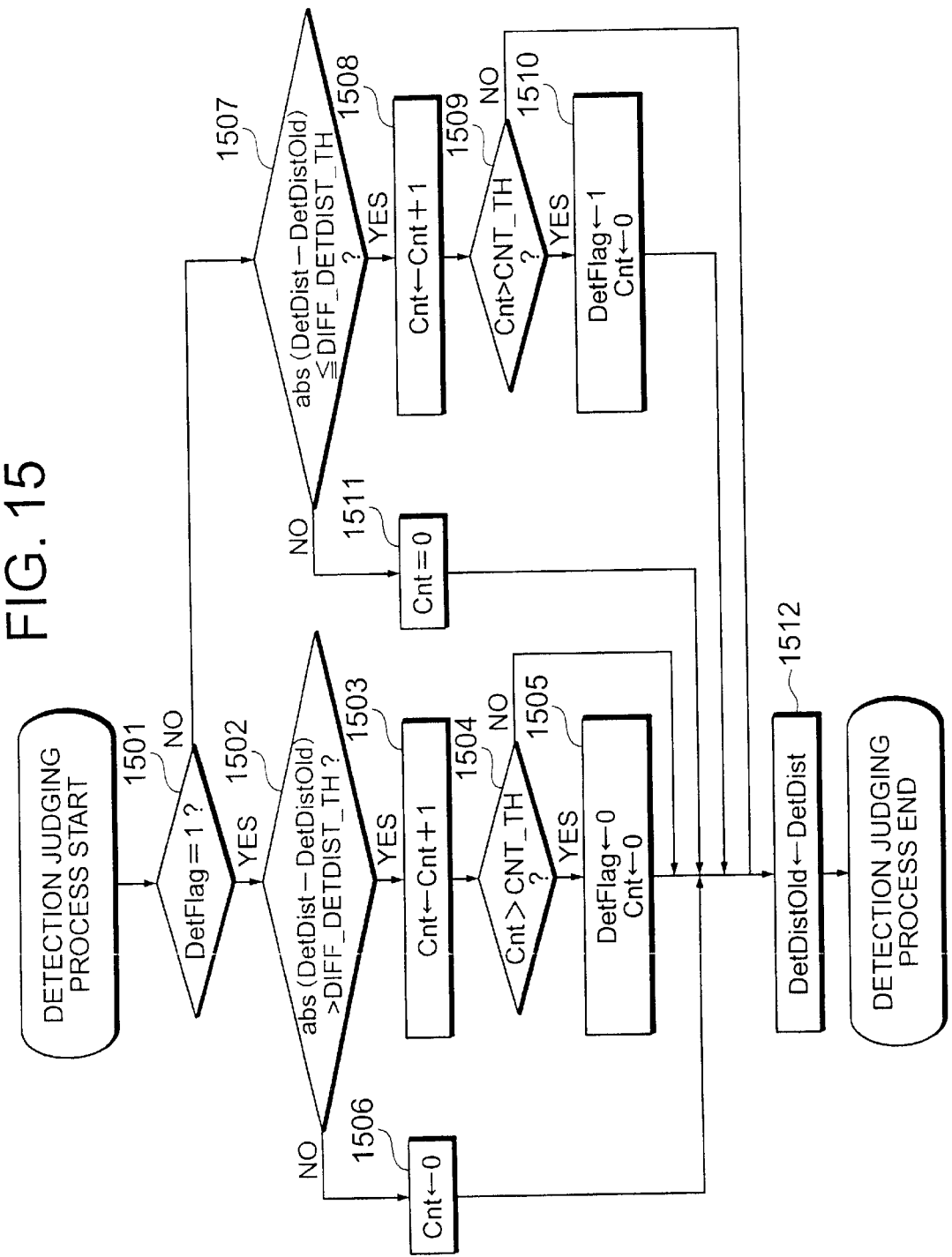
FIG. 15 is a flowchart showing the operation in accordance with the first embodiment of the present invention.

In FIG. 15, it is judged whether the previous distance is calculated, or not, depending on whether the detection flag DetFlag being "1", or not (Step 1501).

In Step 1501, if it is judged that DetFlag=1 (that is, YES), the differential absolute value between the detection distance DetDist and the previous detection distance DetDistOld with a predetermined value DIFF_DETDIST_TH to judge whether the differential absolute value is larger than the predetermined value DIFF_DETDIST_TH, or not (Step 1502).

In Step 1502, if it is judged that the differential absolute value between the detection distance DetDist and the previous detection distance DetDistOld is larger than the predetermined value DIFF_DETDIST_TH (that is, YES), it is judged that the detection distance DetDist is a distance to the target object. Subsequently, a counter Cnt is incremented (Step 1503), and the counter Cnt is compared with a predetermined value CNT_TH to judge whether the counter Cnt is larger than the predetermined value, or not (Step 1504).

In Step 1504, if it is judged that Cnt>CNT_TH (that is, YES), it is assumed that another target object is detected, the detection flag DetFlag and the counter Cnt are set to "0", respectively (Step 1505), and the operation is advanced to a Step 1512.

On the other hand, in Step 1504, if it is judged that Cnt CNT_TH (that, is NO), it is assumed that the same target object is detected, and the operation skips a Step 1505 and is then advanced to a Step 1512.

Also, in Step 1502, it is judged that the differential absolute value is equal to or lower than the predetermined value DIFF_DETDIST_TH (that is, NO), it is assumed that no target object is detected, and the counter Cnt is set to "0" (Step 1506), and the operation is advanced to Step 1512.

On the other hand, in Step 1501, if it is judged that DetFlag=0 (that is, NO), the differential absolute value between the detection distance DetDist and the previous detection distance DetDistOld is compared with the predetermined value DIFF_DETDIST_TH, to judge whether the differential absolute value is equal to or lower than the predetermined value DIFF_DETDIST_TH, or not (Step 1507).

In Step 1507, if it is judged that the differential absolute value is equal to or lower than the predetermined value DIFF_DETDIST_TH (that is, YES), the counter Cnt is incremented (Step 1508), and the counter Cnt and the predetermined value CNT_TH are compared with each other to judge whether the counter Cnt is larger than the predetermined value CNT_TH, or not (Step 1509). In Step 1509, if it is judged that Cnt>CNT_TH (that is, YES), the detection flag is set to "1", the counter Cnt is set to "0" (Step 1510), and the operation is advanced to Step 1512.

On the other hand, in Step 1509, if it is judged that Cnt CNT_TH (that, is NO), the operation skips Step 1510 and is then advanced to Step 1512.

Also, in Step 1507, if it is judged that the differential absolute value is larger than the predetermined value DIFF_DETDIST_TH (that, is NO), the counter Cnt is set to "0" (Step 1511), and the operation is advanced to Step 1512.

Finally, in Step 1512, the detection distance DetDist is substituted for the previous detection distance DetDistOld to complete the detection judging process shown in FIG. 15 (Step 1512).

As described above, the differential absolute value between the detection distance DetDist and the previous detection distance DetDistOld is compared with the predetermined value DIFF_DETDIST_TH, to judge whether the target object is detected, or not. If the judgment is that the target object is detected, the distance calculated through the distance calculating process is determined as a distance to the target object.

The detection flag DetFlag is set only when the detection distance is thus stably calculated, thereby being capable of preventing the erroneous detection due to the noise.

Also, the magnitudes of the receive signals at the respective sampling timings are integrated to detect a change with respect to time in the magnitude of the receive signal due to the phase difference between the leakage signal component and the reflection signal component with a time, the distance to the target object is calculated and the presence of the target object is detected. Therefore, even if the noises of the leakage signal component between the transmit and receive and the reflection signal component from the radome or the like exist, the target object can be accurately detected.

Also, since the detection threshold value can be automatically adjusted so that the noises in the receive signal and the reflection signal component from the target object can be discriminated by adjusting the ground level of the receive signal, even in the case where the level of the noise of the leakage signal component is different depending on the difference of the radar mounting state, the pulse radar device can be used without specific adjustment. Even if the detection threshold value per se is controlled, the same effect can be obtained.

In addition, since the linear interpolation is conducted by using the mean value of the integration values of the differential absolute values at the respective sampling timings, the resolution of the distance measurement can be improved at a rough sampling interval.

Second Embodiment

In the above-mentioned first embodiment, the absolute values of the changes at the respective sampling timings are integrated together to detect the target object. Alternatively, it is possible that the mean value of the integration values of a specific number of times is calculated, and the absolute values of differences between the mean value and the integration values at the respective sampling timings are calculated to ease the detection of the target object small in the relative speed.

Figure 16:
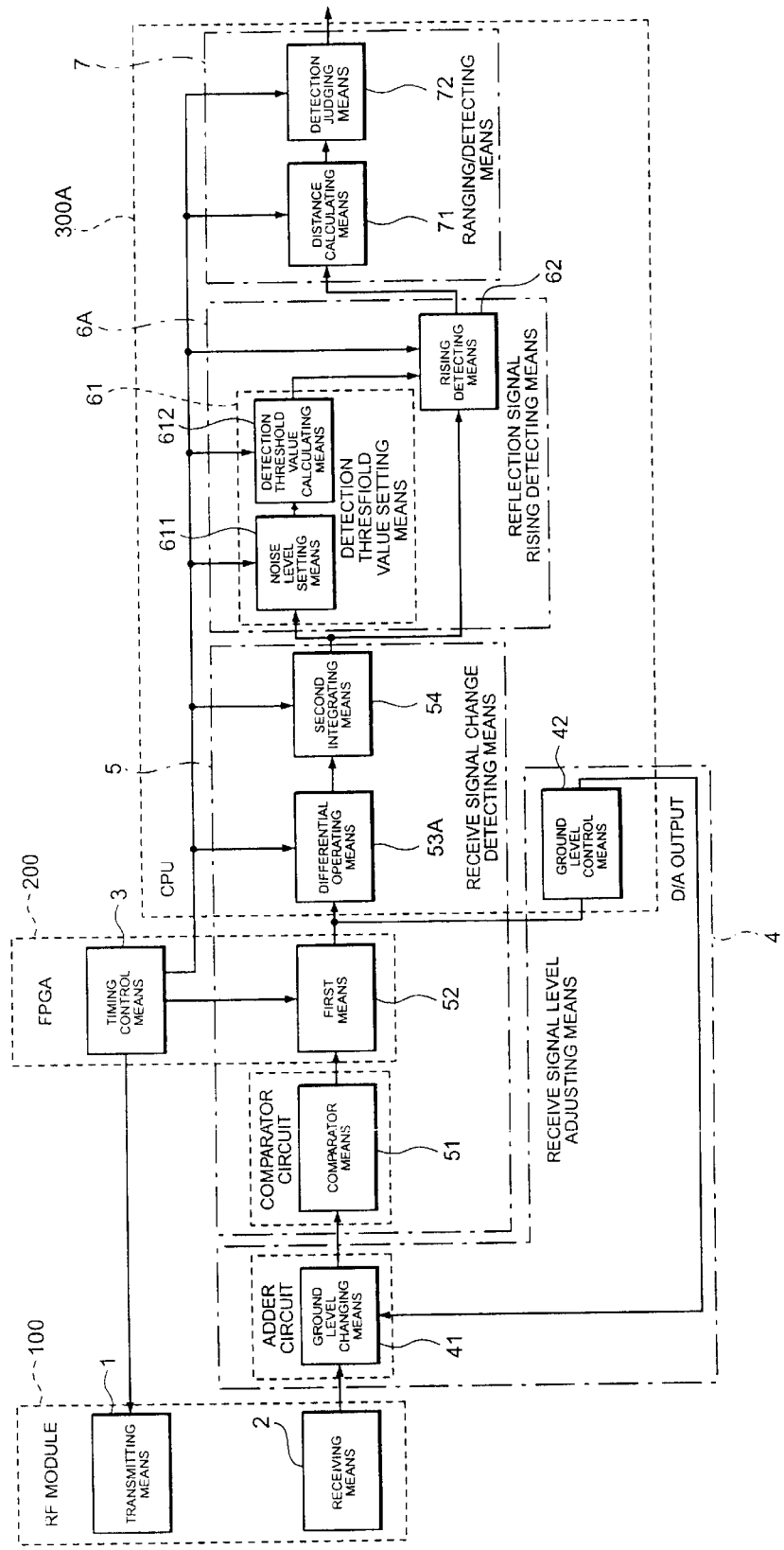
FIG. 16 is a structural block diagram showing second and third embodiments of the present invention.

Hereinafter, a description will be given of a second embodiment of the present invention where the detection of the target object small in relative speed is eased with reference to the accompanying drawings. FIG. 16 is a structural block diagram showing the second embodiment of the present invention.

In FIG. 16, the same parts as those described above (refer to FIG. 1) are denoted by identical symbols, or A is added to the back of the symbol, and their detailed descriptions will be omitted.

In this case, a reflection signal rising detecting means 6A includes a detection threshold value setting means 61 and a rising detecting means 62. Also, the detection threshold value setting means 61 is made up of a noise level setting means 611 and a detection threshold value calculating means 612.

Next, the operation of the differential operating means 53A in accordance with the second embodiment of the present invention will be described with reference to flowcharts shown in FIGS. 17 and 18.

Figure 17:
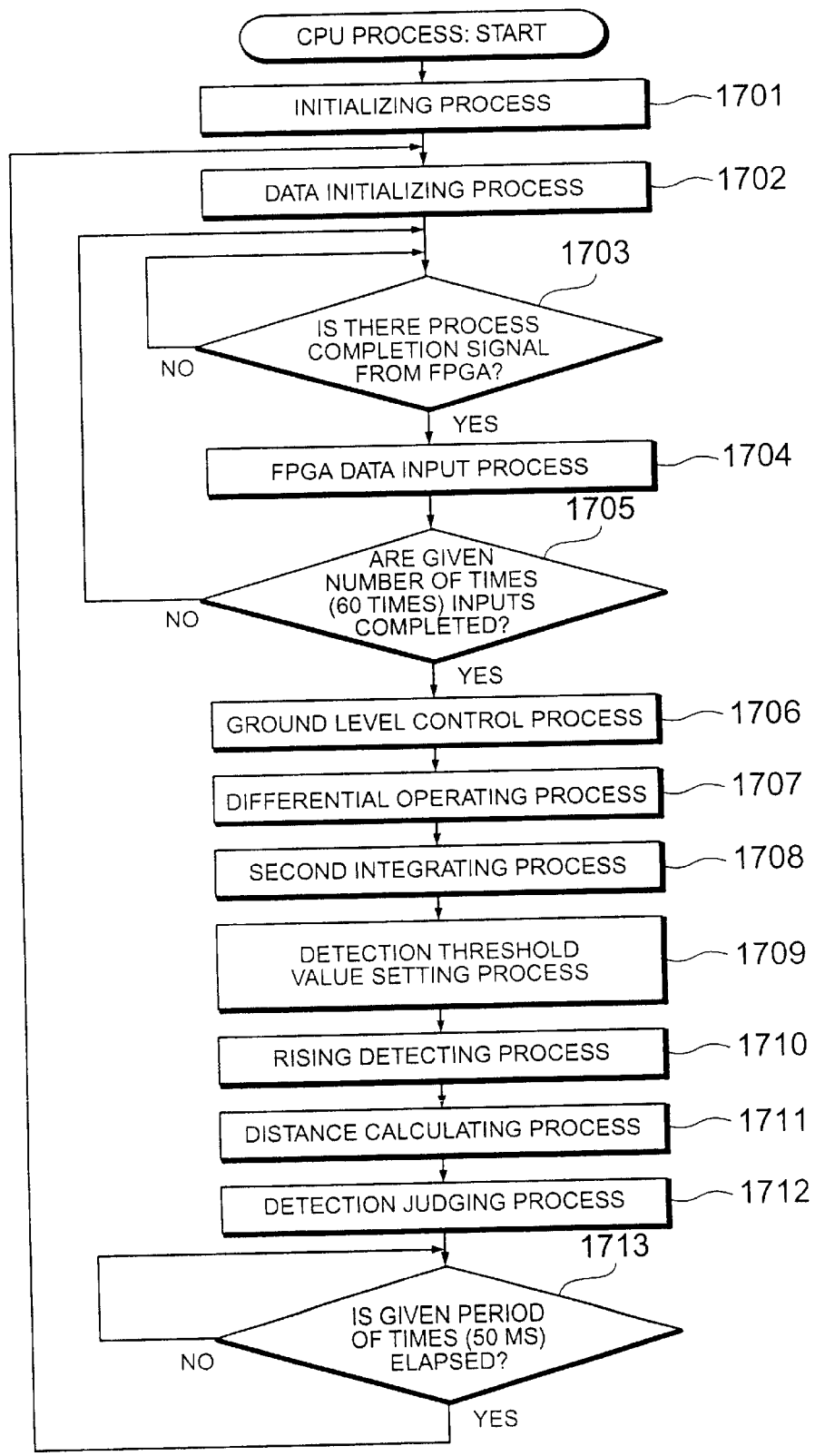
FIG. 17 is a flowchart showing an operation in accordance with the second and third embodiments of the present invention.

In FIG. 17, Steps 1701 to 1708 and Steps 1711 to 1713 correspond to Steps 501 to 512 described above (refer to FIG. 5). Also, Steps 1709 and 1710 correspond to the processing operation of the detection threshold value setting means 61 and the rising detecting means 62.

The process by the differential operating means 53A is executed in the processing Step 1707 of the CPU 300A as described above (Step 507 in FIG. 5).

Figure 18:
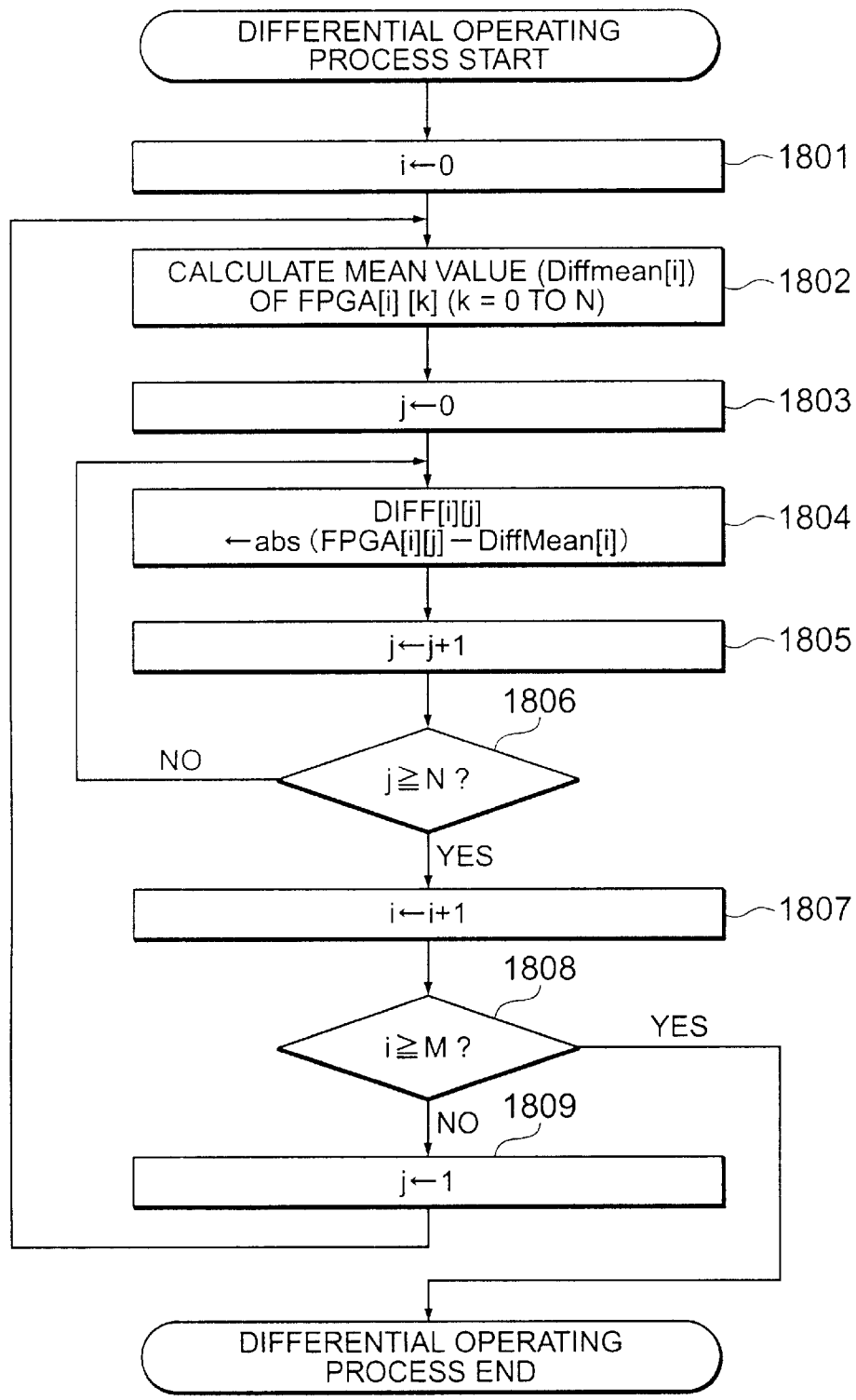
FIG. 18 is a flowchart showing the operation in accordance with the second embodiment of the present invention.

FIG. 18 shows the processing operation by the differential operating means 53A.

In FIG. 18, Steps 1805 to 1809 correspond to the above-mentioned Steps 1103 to 1108 (refer to FIG. 11).

First, the variable i is set to "0" (Step 1801), and the mean value DiffMean[i] of the integration values FPGA[i] [0] to FPGA[i] [59] (in the case where the number of times of integrations of the first integrating means 52 is 60) at the respective sampling timings is calculated (Step 1802).

Then, the variable j is set to "0" (Step 1803), and the differential absolute value Diff[i] [j] between the mean value DiffMean[i] and the integration value FPGA[i] [j] is calculated (Step 1804).

Subsequently, the variable j is incremented (Step 1805), and the variable j and the number of times of integrations N at the first integrating means 52 are compared with each other to judge whether the variable j is equal to or more than the number of times of integrations N, or not (Step 1806).

In Step 1806, if it is judged that j<N (that, is NO), the operation is returned to Step 1804, whereas if it is judged that j N (that is, YES), the variable i is incremented (Step 1807).

Subsequently, the variable i and the number of bits M of the shift register in the first integrating means 52 are compared with each other to judge whether the variable i is equal to or more than the number of bits M, or not (Step 1808).

In Step 1808, if it is judged that i<M (that, is NO), the variable j is set to "1", and the operation returns to Step 1802, whereas it is judged that i M (that is, YES), the differential operating process shown in FIG. 18 is completed.

As described above, the mean value DiffMean[i] of the specific number of times of integrations (for example, 60 times) at the first integrating means 52 is calculated, and the differential absolute value Diff [i] [j] between the mean value and the integration values at the respective sampling timings are calculated.

Also, the differential absolute value Diff[i] [j ] between the mean value obtained by performing integrations a specific number of times at the first integrating means 52 and the integration values at the respective sampling timings are calculated. As a result, even when the relative speed is small and the temporal change is small, the integration value can be obtained, and the change in the receive signal can be detected, thereby being capable of facilitating the detection of the target object small in relative speed.

Third Embodiment

In the above-mentioned first and second embodiments, the automatic learning of the noise level is not particularly described. However, automatic learning may be conducted even with respect to a change in the noise level so that the pulse radar device can be used without any specific change.

Hereinafter, a third embodiment of the present invention where the noise level is automatically learned will be described with reference to the accompanying drawings.

The device structure in this case is identical with the above-mentioned structure (refer to FIG. 16). Also, the processing operation of the CPU 300A is shown in FIG. 17.

Subsequently, the operation of the reflection signal rising detecting means 6A in accordance with the third embodiment of the present invention will be described in more detail with reference to flowcharts shown in FIGS. 16 and 17 as well as FIGS. 19 and 20.

As shown in FIG. 17, in the processing procedure in the reflection signal rising detecting means 6A, the process (Step 1710) of the rising detecting means 62 is conducted subsequent to the process of the detection threshold value setting means 61 (Step 1709).

Figure 19:
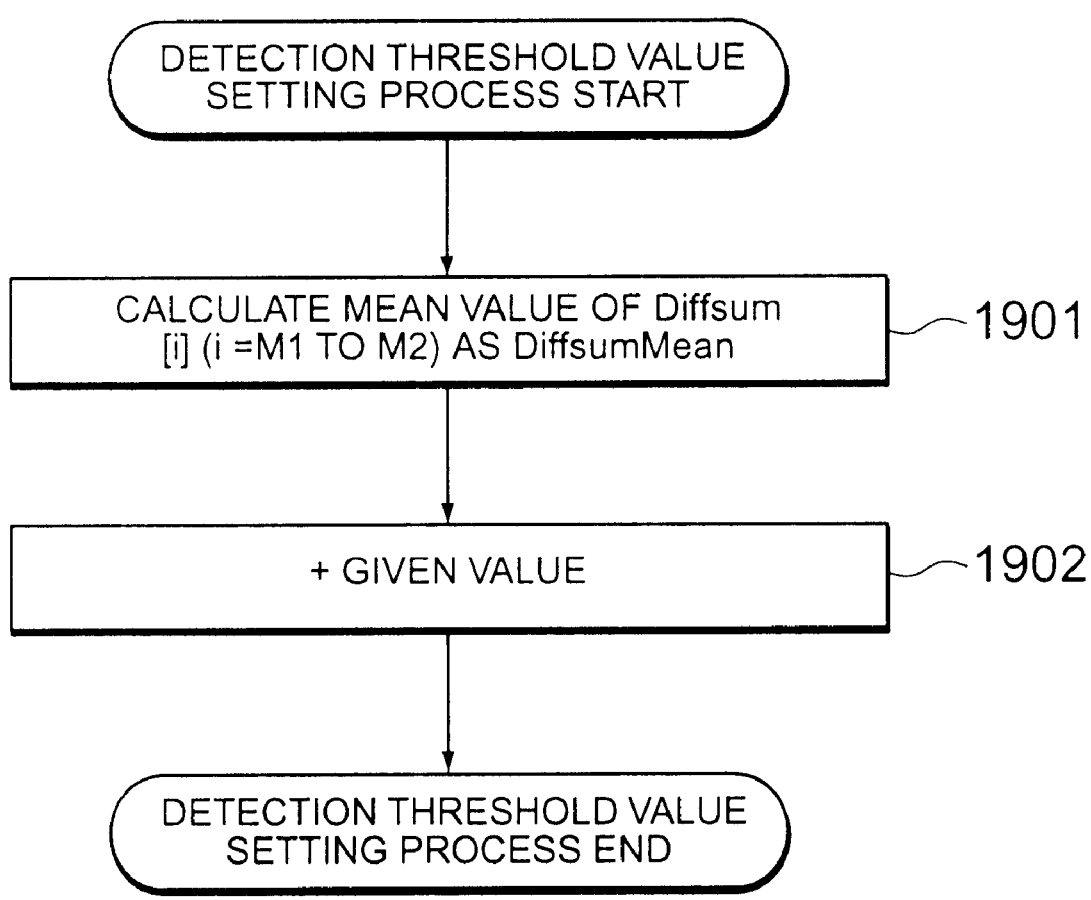
FIG. 19 is a flowchart showing the operation in accordance with the third embodiment of the present invention.

FIG. 19 shows the processing operation of the detection threshold value setting means 61 which is made up of the processing of the noise level setting means 611 and the detection threshold value calculating means 612.

In FIG. 19, the noise level setting means 611 first calculates the mean value DiffSumMean of the sum DiffSum[i] (i=M1 to M2, M1 to M2: a range at a given sampling timing) of the integration values at the respective sampling timings which are calculated by the second integrating means 54 (Step 1901).

In this example, M1 to M2 are values within a range where a target object normally does not exist. Assuming M1=M2, the integration value at any one of the sampling timings may be the mean value DiffSumMean as it is.

Subsequently, the detection threshold value calculating means 612 adds a predetermined value to the mean value DiffSumMean to set the result as the detection threshold value DiffSumThval (Step 1902) and completes the detection threshold value setting process shown in FIG. 19.

The predetermined value added in Step 1902 may be set in accordance with a variation of the noise level or may be set so as to coincide with the maximum value of the variations between the mean value DiffSumMean and the sum DiffSum[i] of the integration values.

Subsequently, the processing operation of the rising detecting means 62 will be described with reference to FIG. 20.

Figure 20:
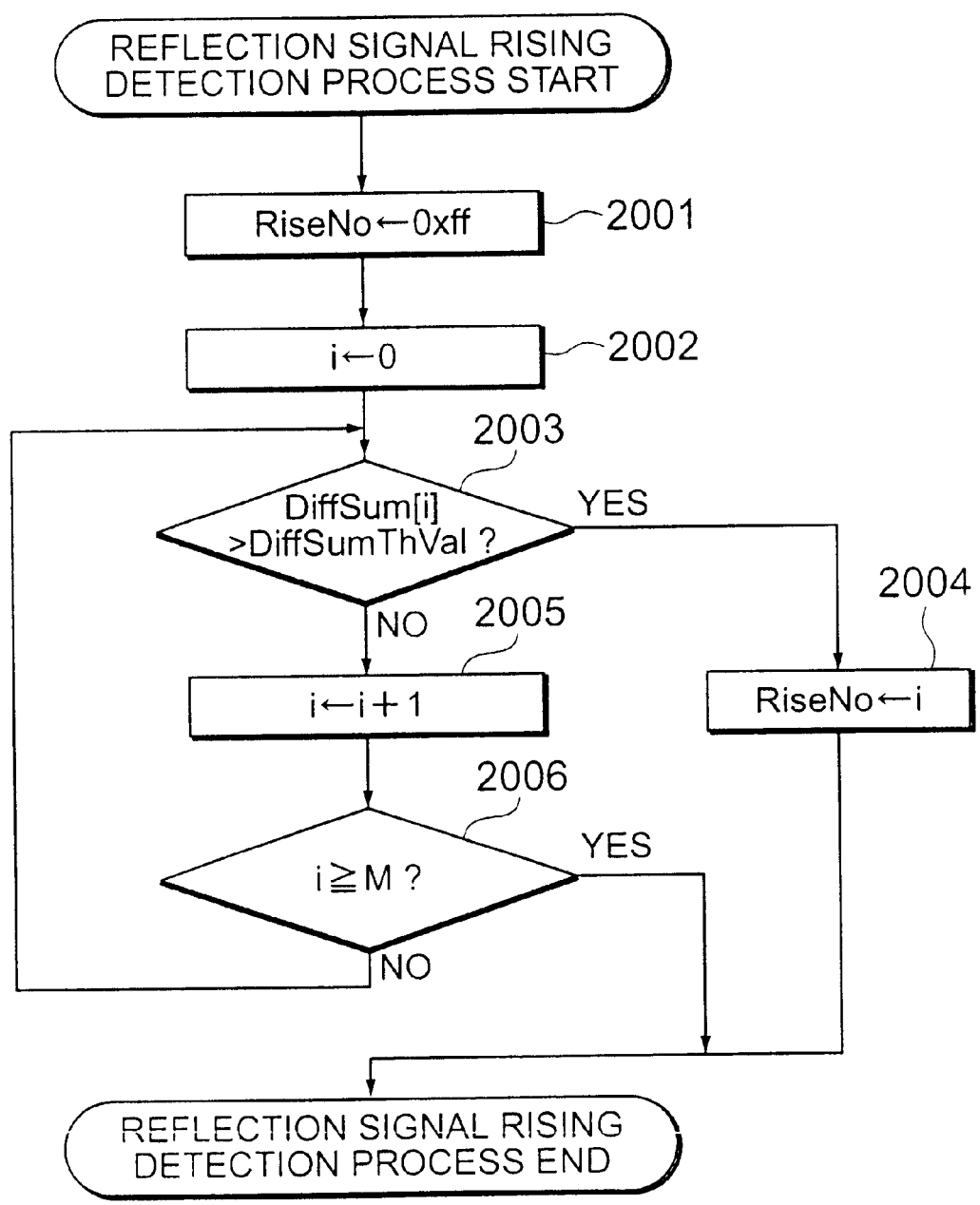
FIG. 20 is a flowchart showing the operation in accordance with the third embodiment of the present invention.

In FIG. 20, the sampling timing No. RiseNO is initially set to "255 (0xFF, which is given in hexadecimal)" (Step 2001), and the variable i is initially set to "0" (Step 2002).

Subsequently, the sum DiffSum[i] of the integration values at the respective sampling timings which are calculated by the second integrating means 54 is compared with the detection threshold value DiffSumThval which is calculated by the detection threshold value setting means 61 to judge whether the sum DiffSum[i] of the integration values is larger than the detection threshold value DiffSumThval, or not (Step 2003).

In Step 2003, if it is judged that DiffSum[i] >DiffSumThVal (that is, YES), the variable i is substituted for the sampling timing No. RiseNo (Step 2004), to complete the rising detecting process shown in FIG. 20.

On the other hand, in Step 2003, if it is judged that DiffSum[i] DiffSumThval (that, is NO), the variable i is incremented (Step 2005), and the variable i and the number of bits M of the shift register in the first integrating means 52 are compared with each other, to judge whether the variable i is equal to or more than the number of bits M, or not (Step 2006).

In Step 2006, if it is judged that i M (that is, YES), the rising detecting process shown in FIG. 20 is completed, whereas if it is judged that i<M (that is, NO), the operation returns to Step 2003.

As described above, even in the case where a location in which a radar is employed is moved, where the use condition is different, and where the noise level of the receive signal varies, since the detection threshold value is automatically calculated, the pulse radar device can be used while maintaining the reliability without any specific change.

Fourth Embodiment

The target object may be detected in a wide-range relative speed region by using the differential operating means 53 and 53A in the first and second embodiments.

Figure 21:
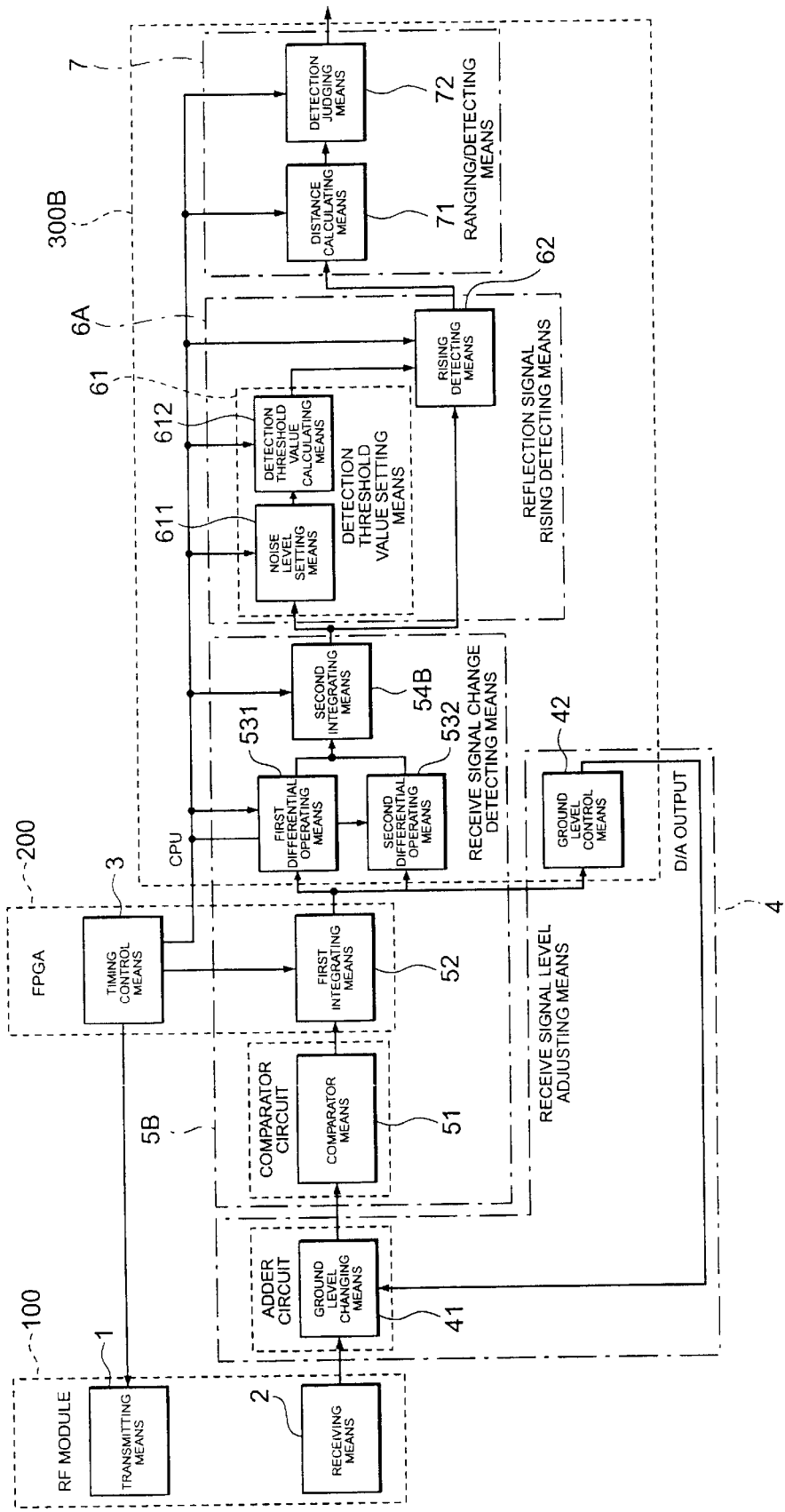
FIG. 21 is a structural block diagram showing a fourth embodiment of the present invention.

Hereinafter, a description will be given of a fourth embodiment of the present invention where a target object can be detected in a wide-range relative speed region with reference to the accompanying drawings. FIG. 21 is a structural block diagram showing the fourth embodiment of the present invention, and the same parts as those described above (refer to FIGS. 1 and 16) are denoted by identical references or B is added to the back of the references, and their detailed description will be omitted.

In FIG. 21, the differential operating means is made up of first differential operating means 531 and second differential operating means 532.

Output terminals of the first differential operating means 531 and the second differential operating means 532 are connected to a second integrating means 54B.

Subsequently, the processing operation of the respective differential operating means 531 and 532 in accordance with the fourth embodiment of the present invention will be described in more detail with reference to flowcharts shown in FIGS. 22 to 24.

Figure 22:
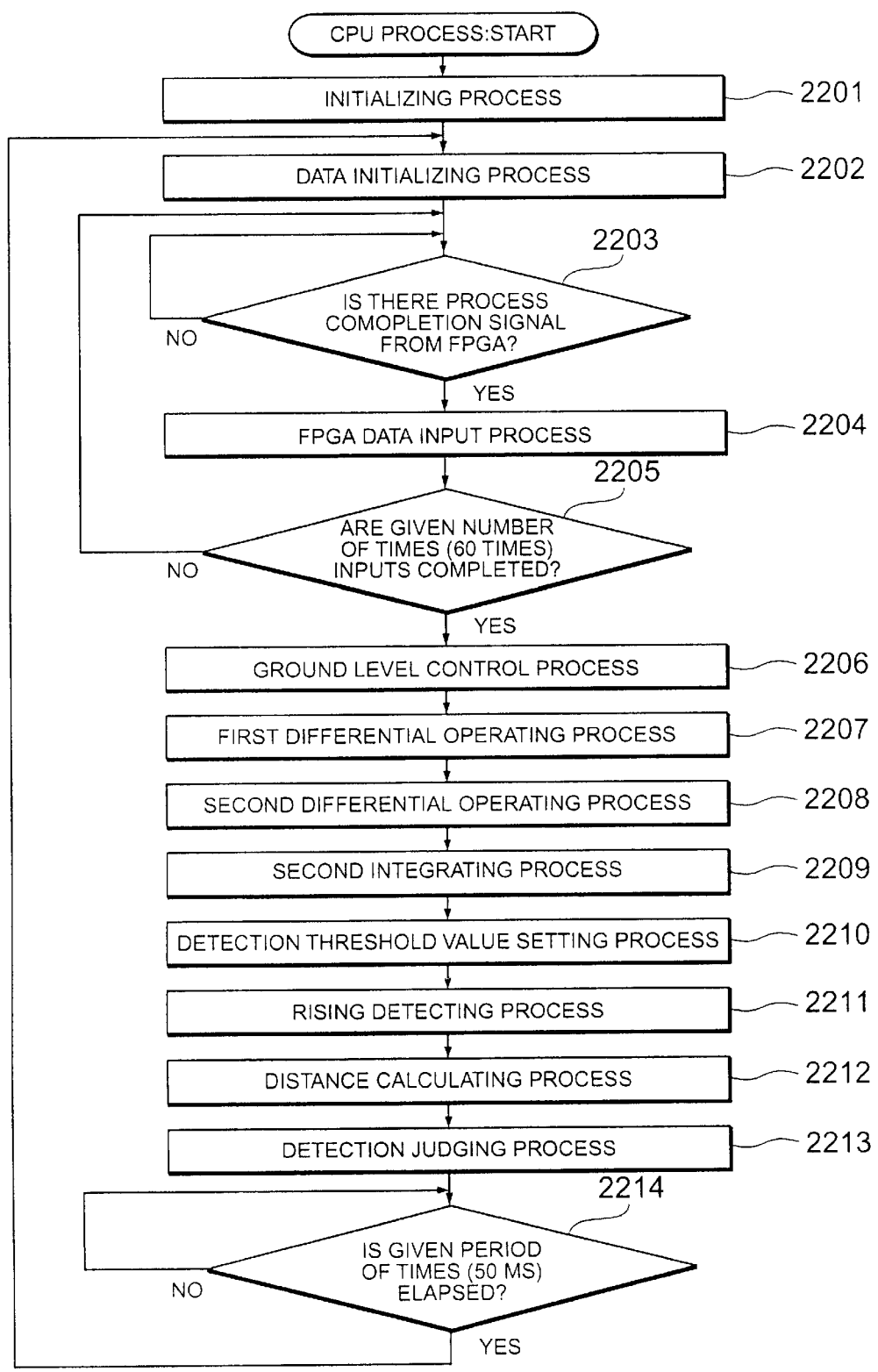
FIG. 22 is a flowchart showing an operation in accordance with the fourth embodiment of the present invention.

In FIG. 22, Steps 2201 to 2206 and 2209 to 2214 correspond to Steps 1701 to 1706 and 1708 to 1713 described above (refer to FIG. 17).

In this case, the respective differential operating means 531 and 532 execute the first differential operating process (Step 2207) and the second differential operating process (Step 2208) in the order.

Figure 23:
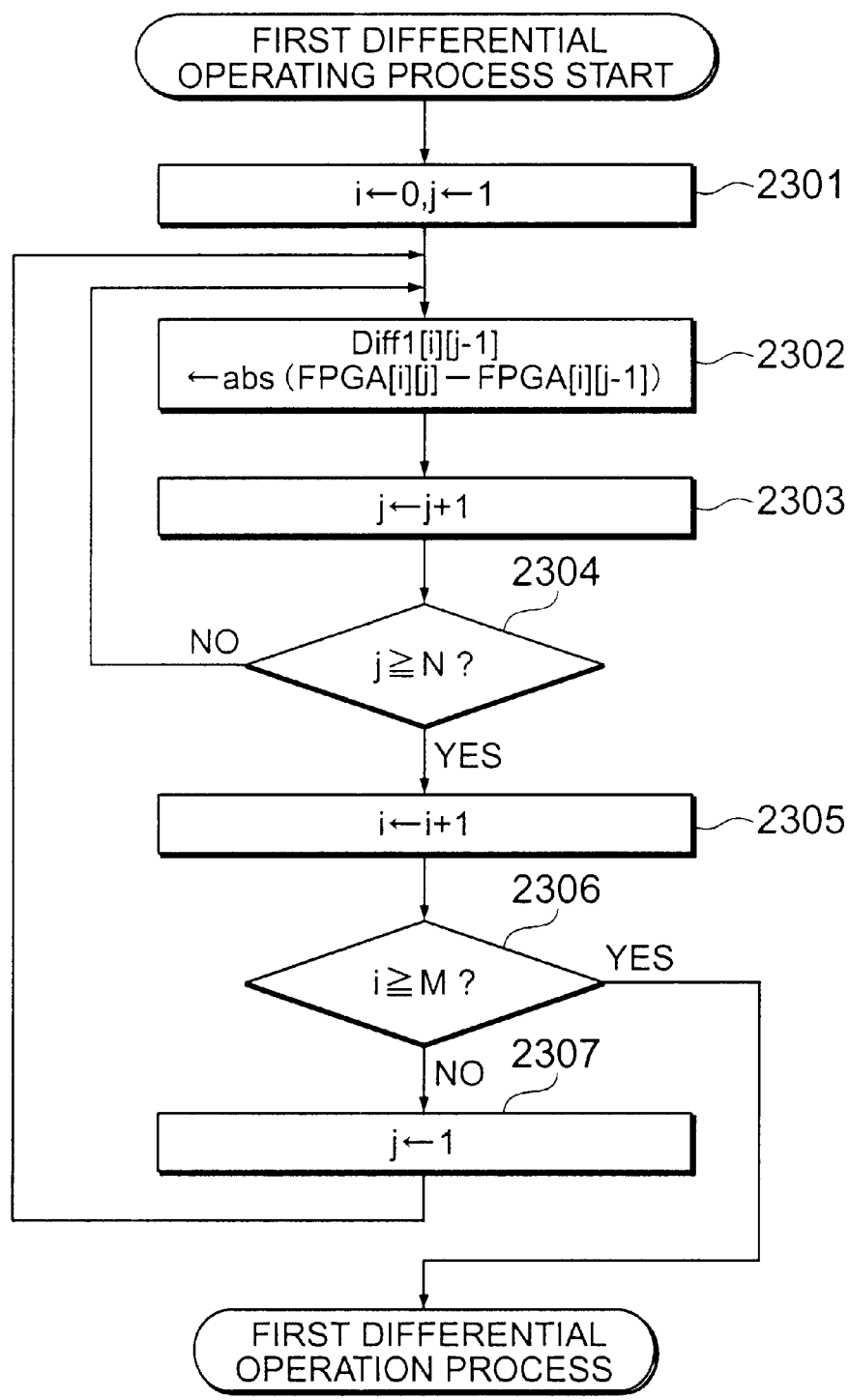
FIG. 23 is a flowchart showing the operation in accordance with the fourth embodiment of the present invention.

In FIG. 23, Steps 2301 to 2307 correspond to the above-mentioned Steps 1101 to 1107 (refer to FIG. 11).

In this case, the differential absolute value Diff1[i] [j] of the integration values which is calculated in the first differential operating process 531 is the differential absolute value Diff[i] [j] of the integration values which is calculated in the processing due to the above-mentioned (refer to FIG. 1) differential operating means 53 (refer to FIG. 1). Therefore, since the operation is identical with that in the first embodiment, its description will be omitted.

Figure 24:
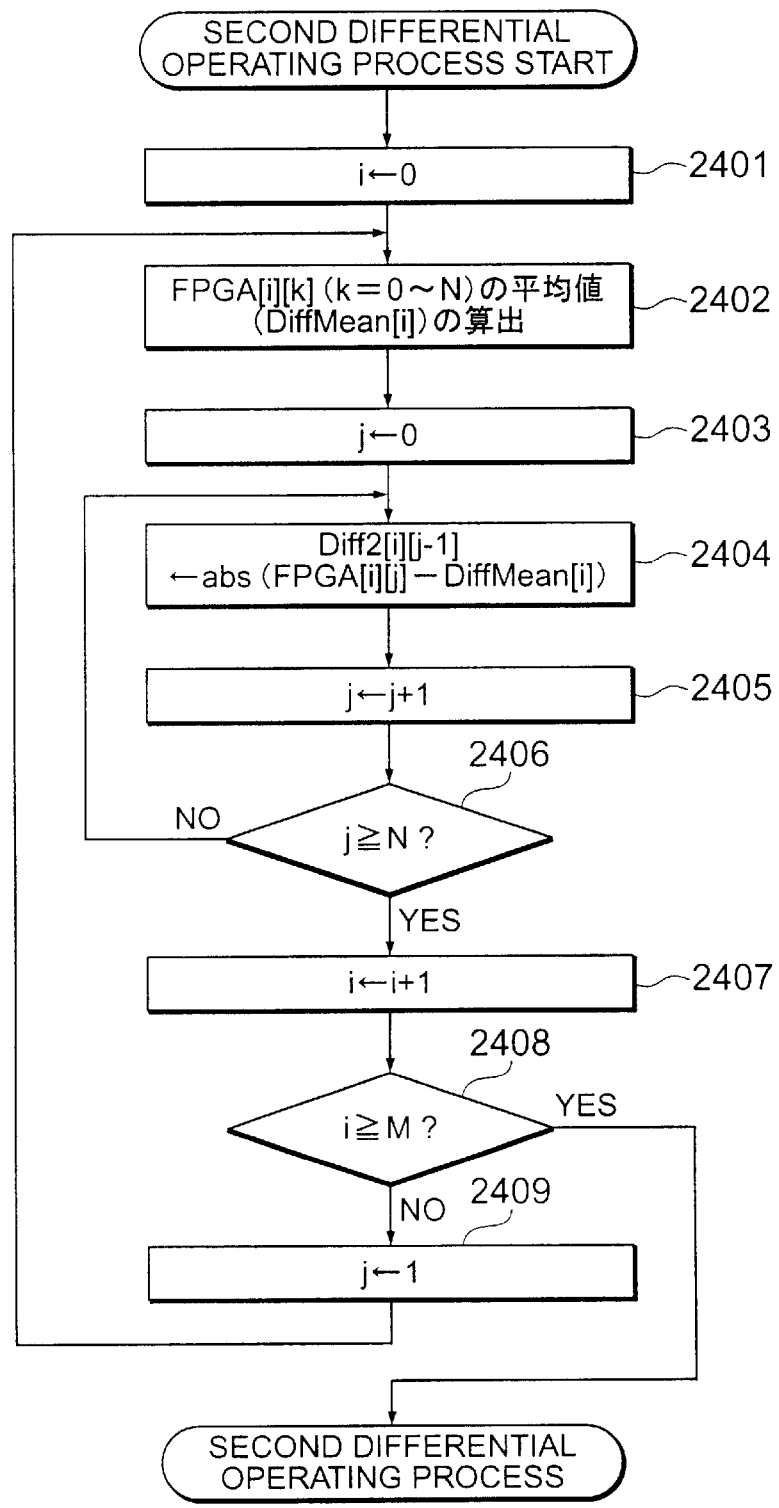
FIG. 24 is a flowchart showing the operation in accordance with the fourth embodiment of the present invention.

Also, in FIG. 24, Steps 2401 to 2409 correspond to Steps 1801 to 1809 described above (refer to FIG. 18).

In this case, the differential absolute value Diff2[i] [j] of the integration values which is calculated in the second differential operating process 532 is the differential absolute value Diff[i] [j] of the integration values which is calculated in the processing due to the above-mentioned (refer to FIG. 16) differential operating means 53A (refer to FIG. 18). Therefore, since the operation is identical with that in the second embodiment, its description will be omitted.

Subsequently, the processing operation by the second integrating means 54B will be described with reference to FIG. 25.

Figure 25:
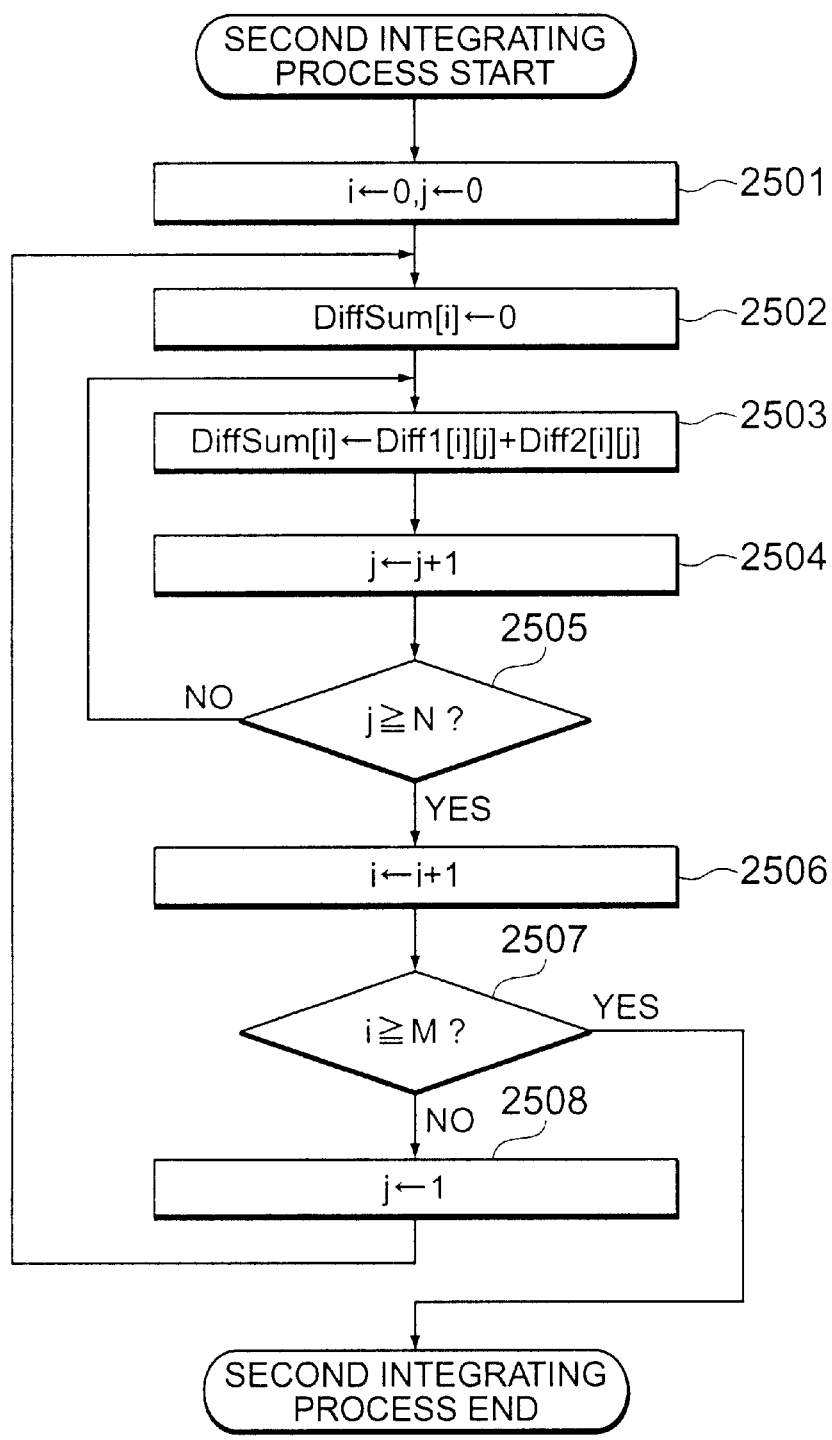
FIG. 25 is a flowchart showing the operation in accordance with the fourth embodiment of the present invention.
Figure 26:
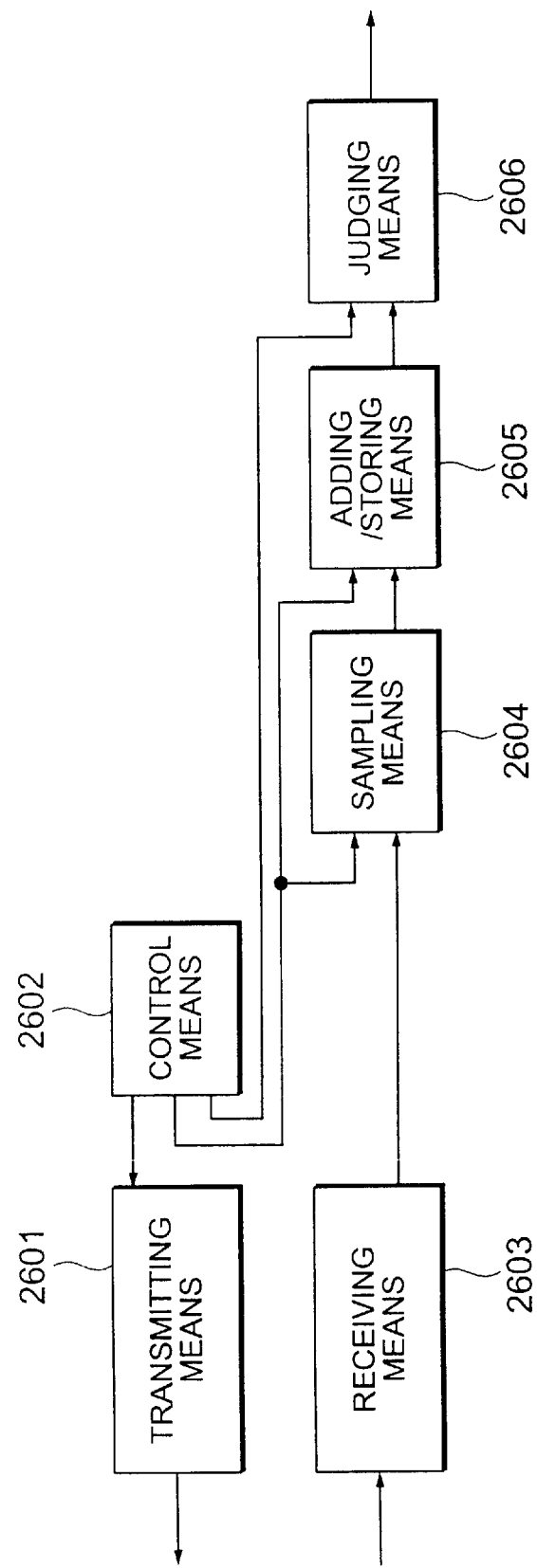
FIG. 26 is a structural block diagram showing a conventional pulse radar device.

In FIG. 25, Steps 2501 to 2508 correspond to Steps 1201 to 1208 described above (refer to FIG. 12), and only Step 2503 is different.

First, the variables i and j are initially set to "0" (Step 2501), and the sum DiffSum[i] of the integration values which are calculated by the respective differential operating means 531 and 532 are initially set to "0" (Step 2502).

Subsequently, a sum of the sum Diff1[i] [j] of the integration values by the first differential operating means 531 and the sum Diff2[i] [j] of the integration values by the second differential operating means 532 is added to the sum Diffsum[i] of the integration values (Step 2503), and the variable j is incremented (Step 2504).

Subsequently, the variable j is compared with the number of times of integrations N by the first integrating means 52 to judge whether the variable j is equal to or more than the number of times of integrations, or not (Step 2505).

In Step 2505, if it is judged that j<N (that is, NO), the operation returns to Step 2503, whereas if it is judged that j N (that is, YES), the variable i is incremented (Step 2506). The variable i is compared with the number of bits M of the shift register in the first integrating means 52, to judge whether the variable i is equal to or more than the number of bits M, or not (Step 2507).

In Step 2507, if it is judged that i<M (that is, NO), the variable j is set to "1" (Step 2208), and the operation returns to Step 2502, whereas if it is judged that i M (that is, YES), the operation in FIG. 25 is completed.

As described above, since the second integrating process calculates the sum of the integration values of the respective differential operating processes for each of the sampling timings, even if the relative speed of the target object is relatively small or relatively large, the integration values are obtained so that a change in the receive signal can be detected, thereby facilitating the distinction from the noise.

As was described above, according to the present invention, there is provided a pulse radar device, comprising: a timing control means that controls a transmit interval of a pulse signal; a transmitting means that transmits the pulse signal under the control by the timing control means; a receiving means that receives a receive signal including a reflection signal component from a target object due to the pulse signal and a noise component; a receive signal change detecting means that detects a change in the assembly of the receive signals of the assembly of the pulse signals as many as a given number of times of transmissions which are transmitted during a first transmit interval under the control by the timing control means and the assembly of the pulse signals as many as a given number of times of transmissions which are transmitted during a second transmit interval; a reflection signal rising detecting means that detects a rising time point of the reflection signal component on the basis of the change in the assembly of the receive signals; and a ranging/detecting means that obtains a distance value on the basis of the rising time point of the reflection signal and judges the presence of the target object. Therefore, even if a leakage signal component or a reflection signal from a radome or the like exists in the receive signal, the target object can be accurately detected.

Also, according to the present invention, the receive signal change detecting means comprises: a comparator means that compares a level of the receive signal with a given level to binary-code the receive signal; a first integrating means that samples an output value of the comparator means, integrates the output value at each of the first and second transmit intervals as many as the given number of times of transmissions, and calculates the first and second integration values for each of the sampling timings; a differential operating means that calculates a difference value between the first and second integration values; and a second integrating means that integrates the difference values as many as the number of times of integrations for each of the sampling timings. Therefore, even if a noise exists in the receive signal, the reflection signal component from the target object can be accurately detected.

Further, according to the present invention, the receive signal change detecting means comprises: comparator a means that compares a level of the receive signal with a given level to binary-code the receive signal; a first integrating means that samples an output value of the comparator means, integrates the output value at each of the first and second transmit intervals as many as the given number of times of transmissions, and calculates the first and second integration values for each of the sampling timings; a differential operating means that calculates a mean value of the first and second integration values and calculates difference values between the mean value and the first and second integration values; and a second integrating means that integrates the difference values as many as the number of times of integrations for each of the sampling timings. Therefore, even if a noise exists in the receive signal, the target object can be further accurately detected.

Still further, according to the present invention, the receive signal change detecting means comprises: a comparator means that compares a level of the receive signal with a given level to binary-code the receive signal; a first integrating means that samples an output value of the comparator means, integrates the output value at each of the first and second transmit intervals as many as the given number of times of transmissions, and calculates the first and second integration values for each of the sampling timings; a first differential operating means that calculates a first difference value between the first and second integration values; a second differential operating means that calculates a mean value of the first and second integration values and calculates second difference values between the mean value and the first and second integration values; and a second integrating means that integrates the first and second difference values as many as the number of times of integrations for each of the sampling timings. Therefore, even if a noise such as a leakage signal component exists, the target object can be accurately detected in a wide-range relative speed region in such a case where the relative speed at which a temporal change is small is low, or conversely a case where a relative speed at which a temporal change is large is high in the relative speed with respect to the pulse radar device.

Yet still further, according to the present invention, the reflection signal rising detecting means compares the integration value by the second integrating means with a predetermined detection threshold value, and detects, as the rising time point, a sampling timing which is earliest in the transmit time among the sampling timings when the integration value exceeds the detection threshold value. Therefore, even if the radar use environments change and the noise level changes., the change in the noise level is automatically learned without any specific change.

Yet still further, according to the present invention, the reflection signal rising detecting means includes a detection threshold value setting means that variably sets the detection threshold value on the basis of the integration value; in which the reflection signal rising detecting means compares the integration value with the detection threshold value set by the detection threshold value setting means to detect the sampling timing. Therefore, the detection threshold value can be automatically adjusted in accordance with a change in the noise level.

Yet still further, according to the present invention, the detection threshold value setting means includes: a noise level setting means that calculates a mean value of the integration values for each of the sampling timings to set the mean value to a noise level; and a detection threshold value calculating means that calculates the detection threshold value on the basis of the noise level. Therefore, the mean value of the noises at the sampling timings where only the noises exist where no target object normally exists is calculated to cope with the change in the noise level.

Yet still further, according to the present invention, the ranging/detecting means includes: a distance calculating means that calculates the distance value on the basis of the rising time point; and a detection judging means that compares the distance value with a predetermined value to judge the presence of the target object. Therefore, even if the receive signal is sampled at a rough sampling interval, the detection result high in precision can be obtained.

Yet still further, according to the present invention, there is provided a receive signal level adjusting means that adjusts a ground level of the receive signal on the basis of the first and second integration values. Therefore, even in the case where the use conditions such as the radar mounting state are different, and the noise level such as the leakage signal component is different, the pulse radar device can be used without any specific adjustment.

Yet still further, according to the present invention, the receive signal level adjusting means includes: a ground level control means that outputs a control signal for adjusting the ground level on the basis of the first and second integration values; and a ground level changing means that changes the ground level of the receive signal on the basis of the control signal. Therefore, even in the case where the noise level is different due to a change of the use conditions, the pulse radar device can be used without any specific adjustment.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pulse radar device, comprising:
   a timing control means that controls a transmit interval of a pulse signal;
   a transmitting means that transmits the pulse signal under the control of the timing control means;
   a receiving means that receives receive signals including a reflection signal component from a target object based on the pulse signal and a noise component;
   a receive signal change detecting means that detects a change in an assembly of the receive signals of an assembly of pulse signals at least as many times as a number of occurrences of transmissons during a first transmit interval under the control of the timing control means, and detects a change in the assembly of the pulse signals at least as many times as a number of occurrences of transmissions during a second transmit interval;
   a reflection signal rising detecting means that detects a rising time point of the reflection signal component based on the change in the assembly of the receive signals; and
   a ranging/detecting means that obtains a distance value based on the rising rime point of the reflection signal component and judges a presence of a target object.

2. The pulse radar device according to claim 1, wherein the receive signal change detecting means comprises:
   a comparator means that compares a level of one of the receive signals with a given level, in order to binary-code said one of the receive signals;
   a first integrating means that samples an output value of the comparator means, integrates the output value at each of the first and second transmit intervals at least as many times as a number of transmissions, and calculates first and second integration values for each sampling timing;
   a differential operating means that calculates a difference value between the first and second integration values; and
   a second integrating means that integrates the calculated difference value to produce an integration at least as many times as a number of occurrences of integrations, for said each sampling timings.

3. The pulse radar device according to claim 1, wherein the receive signal change detecting means comprises:
   a comparator means that compares a level of one of the receive signals with a given level, in order to binary-code said one of the receive signals;
   a first integrating means that samples an output value of the comparator means, integrates the output value at each of the first and second transmit intervals at least as many times as a number of occurrences of transmissions, and calculates first and second integration values for each sampling timing;
   a differential operating means that calculates a mean value of the first and second integration values, and calculates a difference value between the mean value of the first and second integration values and a first integration value and calculates a second difference value between the mean value of the first and second integration values and the second integration value and
   a second integrating means that integrates the calculated first and second difference values at least as many times as a number of occurrences of integrations, for each sampling timing.

4. The pulse radar device according to claim 1, wherein the receive signal change detecting means comprises:
   a comparator means that compares a level of at least one of the receive signals with a given level, in order to binary-code said one of the receive signals;
   a first integrating means that samples an output value of the comparator means, integrates the output value at each of the first and second transmit intervals at least as many times as a number of occurrences of transmissions, and calculates first and second integration values for each sampling timing;
   a first differential operating means that calculates a first difference value between the first and second integration values;
   a second differential operating means that calculates a mean value of the first and second integration values and calculates a second difference value representing the difference between the mean value of the first and second integration values and the first integration value, and calculates a third difference value representing the difference between the mean value of the first and second integration values and the second integration value; and
   a second integrating means that integrates the calculated first and second difference values at least as many times as a number of integrations, for each sampling timings.

5. The pulse radar device according to claim 2, wherein the reflection signal rising detecting means compares an integration value of the second integrating means with a predetermined detection threshold value, and detects, as the rising time point, a sampling timing which is earliest among sampling timings when the integration value exceeds the detection threshold value.

6. The pulse radar device according to claim 5, wherein the reflection signal rising detecting means comprises detection threshold value setting means that variably sets the detection threshold value based on the integration value;
   wherein the reflection signal rising detecting means compares the integration value with the detection threshold value set by the detection threshold value setting means to detect the sampling timing.

7. The pulse radar device according to claim 6, wherein the detection threshold value setting means comprises:

a noise level setting means that calculates a mean value of integration values for each of the sampling timings to set a mean value to a noise level; and a detection threshold value calculating means that calculates the detection threshold value based on the noise level.

8. The pulse radar device according to claim 1, wherein the ranging/detecting means comprises:

a distance calculating means that calculates the distance value based on the rising time point; and a detection judging means that compares the distance value with a predetermined value to judge the presence of the target object 9. The pulse radar device according to claim 1, further comprising a receive signal level adjusting means that adjusts a ground level of the receive signals based on first and second integration values.

10. The pulse radar device according to claim 9, wherein the receive signal level adjusting means comprises:

a ground level control means that outputs a control signal for adjusting the ground level based on the first and second integration values; and a ground level changing means that changes the ground level of the receive signals based on the control signal.

* * * * *